United States Patent [19]

Lomp et al.

[11] Patent Number: 5,345,467
[45] Date of Patent: * Sep. 6, 1994

[54] CDMA CELLULAR HAND-OFF APPARATUS AND METHOD

[75] Inventors: Gary R. Lomp, Centerport, N.Y.; Gilbert La Vean, Reston, Va.; Donald L. Schilling, Sands Point, N.Y.

[73] Assignee: InterDigital Technology Corp., Wilmington, Del.

[*] Notice: The portion of the term of this patent subsequent to Jan. 12, 2010 has been disclaimed.

[21] Appl. No.: 957,943

[22] Filed: Oct. 8, 1992

Related U.S. Application Data

[63] Continuation-in-part of Ser. No. 727,617, Jul. 10, 1991, Pat. No. 5,179,571.

[51] Int. Cl.$^5$ .............................................. H04L 27/30
[52] U.S. Cl. ....................................................... 375/1
[58] Field of Search .................... 375/1; 455/33.2, 33.3

[56] References Cited

U.S. PATENT DOCUMENTS

| | | | |
|---|---|---|---|
| 3,731,198 | 5/1973 | Blasbalg | 325/42 |
| 3,831,013 | 8/1974 | Alsup et al. | 235/81 |
| 3,838,342 | 9/1974 | Bjorkman | 325/32 |
| 3,900,721 | 8/1975 | Speiser et al. | 235/156 |
| 4,052,565 | 10/1977 | Baxter | 179/1.5 S |
| 4,112,372 | 9/1978 | Holmes et al. | 325/321 |
| 4,164,628 | 8/1979 | Ward et al. | 179/15 BA |
| 4,222,115 | 9/1980 | Cooper et al. | 375/1 |
| 4,238,850 | 12/1980 | Vance | 370/27 |
| 4,247,942 | 1/1981 | Hauer | 375/25 |
| 4,279,018 | 7/1981 | Carson | 364/514 |
| 4,285,060 | 8/1981 | Cobb et al. | 375/1 |
| 4,392,232 | 7/1983 | Andren et al. | 375/86 |
| 4,418,393 | 11/1983 | Zschelle, Jr. | 364/724 |
| 4,418,425 | 11/1983 | Fennel, Jr. et al. | 455/27 |
| 4,425,642 | 1/1984 | Moses et al. | 370/76 |
| 4,425,661 | 1/1984 | Moses et al. | 375/1 |
| 4,455,651 | 6/1984 | Baran | 370/104 |
| 4,479,226 | 10/1984 | Prubhu et al. | 375/1 |
| 4,512,013 | 4/1985 | Nash et al. | 370/69.1 |
| 4,523,311 | 6/1985 | Lee et al. | 370/69.1 |
| 4,538,280 | 8/1985 | Mosley, Jr. et al. | 375/1 |
| 4,553,130 | 11/1985 | Kato | 340/347 DD |
| 4,563,774 | 1/1986 | Gloge | 455/607 |
| 4,606,039 | 8/1986 | Nicolus et al. | 375/1 |

(List continued on next page.)

OTHER PUBLICATIONS

Pleadings in suit between InterDigital Technology Corp. and Oki America, Inc. et al., Defendant QUALCOMM Incorporated's Supplemental Responses to Plaintiff's Interrogatories 3, 5, 12, and 13; U.S. Dist. Ct. for the Eastern Dist. of Pa.; Civil Case No. 93-CV-2004 (Bartle, J.) pp. 5-6, 12-13.

(List continued on next page.)

Primary Examiner—Salvatore Cangialosi
Attorney, Agent, or Firm—David Newman & Associates

[57] ABSTRACT

An apparatus for controlling hand-off in a spread-spectrum-CDMA-communications system, for radio devices moving from one cell to another, with each cell having a base station transmitting spread spectrum signals with generic-chip-code signals. A radio device includes a cellular antenna, matched filters, and detectors for detecting generic-chip-code signals embedded in spread-spectrum-communications signals. A comparator generates a comparison signal by comparing the relative time of arrival of a second detected signal with a first detected signal. A receiver-message-chip-code generator generates a replica of the message-chip-code signal, and a message mixer despreads the spread-spectrum-communications signal. A synchronization circuit synchronizes the receiver-message-chip-code generator to the first generic-chip-code signal for receiving the first spread-spectrum-communications signal or to the second generic-chip-code signal for receiving the second spread-spectrum communications signal, depending on a threshold. A control unit switches transmitting the message data, embedded in the first spread-spectrum-communications signal from the first base station, to the second spread-spectrum-communications signal transmitted from the second base station. Hand-off from an analog base station to a second base station utilizing spread spectrum is also possible.

50 Claims, 11 Drawing Sheets

U.S. PATENT DOCUMENTS

| | | | |
|---|---|---|---|
| 4,612,637 | 9/1986 | Davis et al. | 370/95 |
| 4,612,652 | 9/1986 | Kadin | 375/1 |
| 4,621,365 | 11/1986 | Chiu | 375/1 |
| 4,630,283 | 12/1986 | Schiff | 375/1 |
| 4,647,863 | 3/1987 | Skudera, Jr. et al. | 329/112 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,672,605 | 6/1987 | Hustig et al. | 370/76 |
| 4,672,629 | 6/1987 | Beier | 375/1 |
| 4,672,658 | 6/1987 | Kavehrad et al. | 379/63 |
| 4,675,839 | 6/1987 | Kerr | 364/821 |
| 4,680,785 | 7/1987 | Akiyama et al. | 379/57 |
| 4,684,467 | 9/1987 | Mui | 375/1 |
| 4,691,326 | 9/1987 | Tsuchiya | 375/1 |
| 4,697,260 | 9/1987 | Grauel et al. | 370/18 |
| 4,703,474 | 10/1987 | Foschini et al. | 370/18 |
| 4,707,839 | 11/1987 | Andren et al. | 375/1 |
| 4,718,080 | 1/1988 | Serrano et al. | 379/59 |
| 4,730,340 | 3/1988 | Frazier, Jr. | 375/1 |
| 4,737,978 | 4/1988 | Burke et al. | 379/60 |
| 4,742,512 | 5/1988 | Akashi et al. | 375/1 |
| 4,759,034 | 7/1988 | Nagazumi | 375/1 |
| 4,761,796 | 8/1988 | Dunn et al. | 375/1 |
| 4,765,753 | 8/1988 | Schmidt | 379/60 |
| 4,789,983 | 12/1988 | Acampora et al. | 370/96 |
| 4,799,253 | 1/1989 | Stern et al. | 379/59 |
| 4,805,208 | 2/1989 | Schwartz | 379/93 |
| 4,807,222 | 2/1989 | Amitay | 370/85 |
| 4,811,380 | 3/1989 | Spear | 379/60 |
| 4,837,802 | 6/1989 | Hiyashiyama et al. | 379/62 |
| 4,841,545 | 6/1989 | Endo et al. | 375/1 |
| 4,850,036 | 7/1989 | Smith | 455/179 |
| 4,860,307 | 8/1989 | Nakayama | 375/1 |
| 4,862,178 | 8/1989 | Sturza et al. | 342/357 |
| 4,866,732 | 9/1989 | Carey et al. | 375/1 |
| 4,894,842 | 1/1990 | Broekhaven et al. | 375/1 |
| 4,901,307 | 2/1990 | Gilhousen et al. | 370/18 |
| 4,912,722 | 3/1990 | Carlin | 375/1 |
| 4,914,651 | 4/1990 | Lusignan | 455/33 |
| 4,914,699 | 4/1990 | Dunn et al. | 380/34 |
| 4,922,506 | 5/1990 | McCallister et al. | 375/1 |
| 4,930,140 | 5/1990 | Cripps et al. | 375/1 |
| 4,932,037 | 6/1990 | Simpson et al. | 375/1 |
| 4,933,953 | 6/1990 | Yagi | 375/1 |
| 4,958,359 | 9/1990 | Kato | 375/1 |
| 4,969,159 | 11/1990 | Belcher et al. | 375/1 |
| 4,977,577 | 12/1990 | Arthur et al. | 375/1 |
| 4,977,578 | 12/1990 | Ishigaki et al. | 375/1 |
| 4,984,247 | 1/1991 | Kaufmann et al. | 375/1 |
| 5,005,169 | 4/1991 | Bronden et al. | 375/1 |
| 5,016,255 | 5/1991 | Dixon et al. | 375/1 |
| 5,016,256 | 5/1991 | Stewart | 375/1 |
| 5,022,047 | 6/1991 | Dixon et al. | 375/1 |
| 5,023,887 | 6/1991 | Takeuchi et al. | 375/1 |
| 5,029,181 | 7/1991 | Endo et al. | 375/1 |
| 5,040,238 | 8/1991 | Comroe et al. | 455/33 |
| 5,048,052 | 9/1991 | Humatsu et al. | 375/1 |
| 5,056,109 | 10/1991 | Gilhausen et al. | 375/1 |
| 5,081,643 | 1/1992 | Schilling | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,128,959 | 7/1992 | Bruckert | 375/1 |
| 5,179,571 | 1/1993 | Schilling | 375/1 |

OTHER PUBLICATIONS

M. K. Simon, J. K. Omura, R. A. Scholtz & B. K. Levitt, *Spread Spectrum Communications*, vol. 1, pp. 1–39, Rockville, Md.: Computer Science Press, 1985.

M. K. Simon, J. K. Omura, R. A. Scholtz & B. K. Levitt, *Spread Spectrum Communications*, vol. 3, pp. 346–407, Rockville, Md.: Computer Science Press, 1985.

R. A. Scholtz, "The Origins of Spread-Spectrum Communications", *IEEE Trans. Commun.*, COM-30, No. 5, pp. 822–854, May 1982.

R. L. Pickholtz, D. L. Schilling, & L. B. Milstein, "Theory of Spread-Spectrum Communications—A Tutorial", *IEEE Trans. Commun.*, COM-30, No. 5, pp. 855–884, May 1982.

R. A. Scholtz, "Notes on Spread-Spectrum History", *IEEE Trans. Commun.*, COM-31, No. 1, pp. 82–84, Jun. 1983.

R. Price, "Further Notes and Anecdotes and Spread-Spectrum Origins", *IEEE Trans. Commun.*, COM-31, No. 1, pp. 85–97, Jan. 1983.

M. Kavehrad, "Performance of Nondiversity Receivers for Spread Spectrum in Indoor Wireless Communications", *AT&T Technical J.*, vol. 64, No. 6, pp. 1181–1210, Jul.–Aug. 1985.

M. Kavehrad & P. J. McLane, "Spread Spectrum for Indoor Digital Radio", *IEEE Commun. Mag.*, vol. 25, No. 6, pp. 32–49, Jun. 1987.

M. Kavehrad & G. E. Bodeep, "Design and Experimental Results for a Direct-Sequence Spread-Spectrum Radio Using Differential Phase-Shift Keying Modulation for Indoor, Wireless Communications", *IEEE Trans. Commun.*, SAC-5, No. 5, pp. 815–823, Jun. 1987.

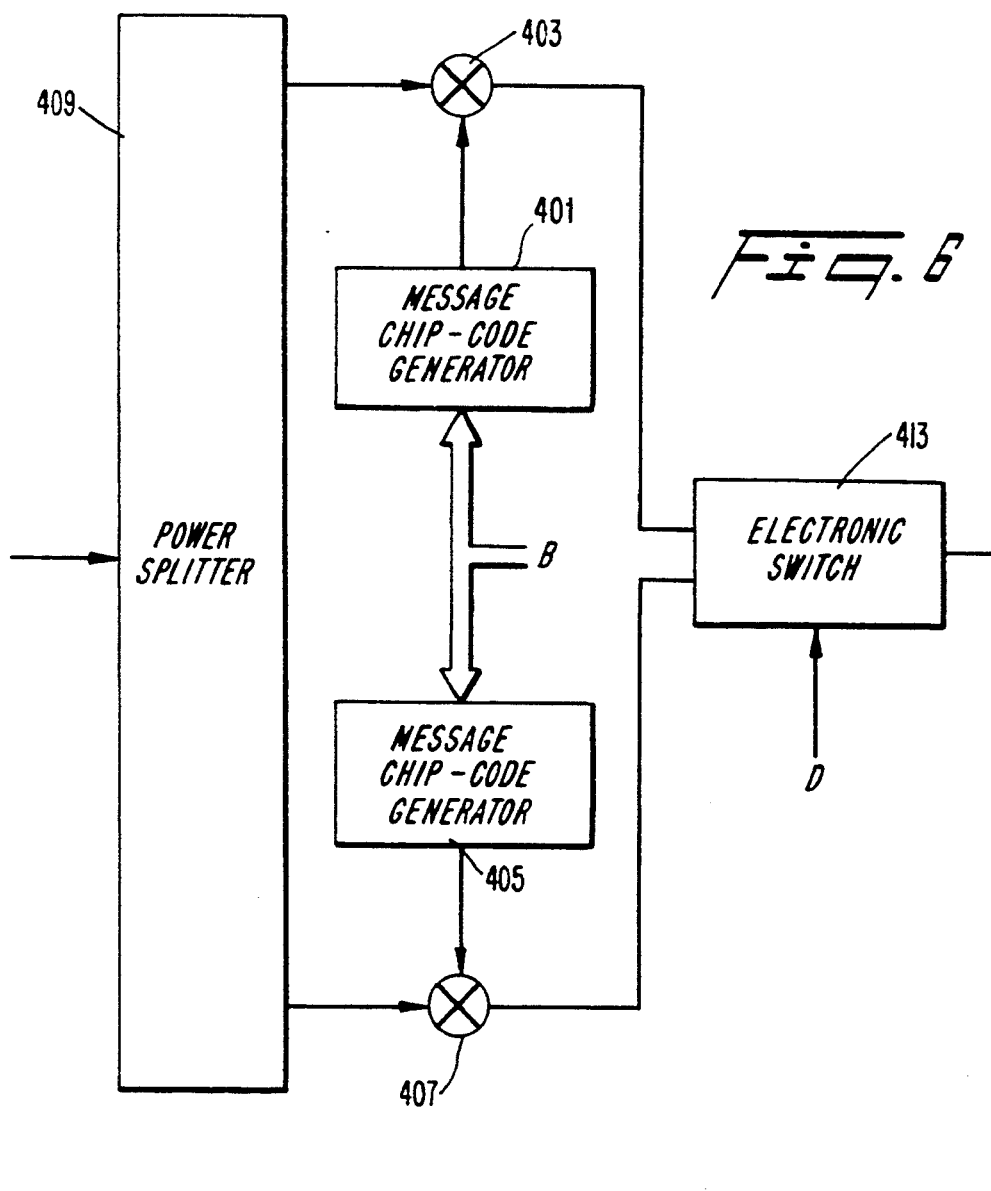
Fig. 6
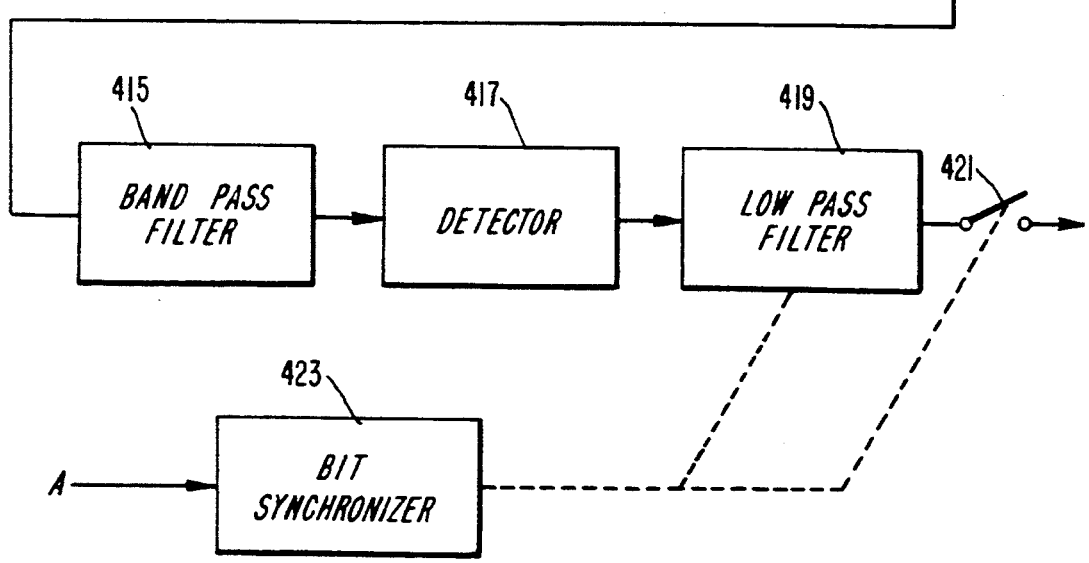

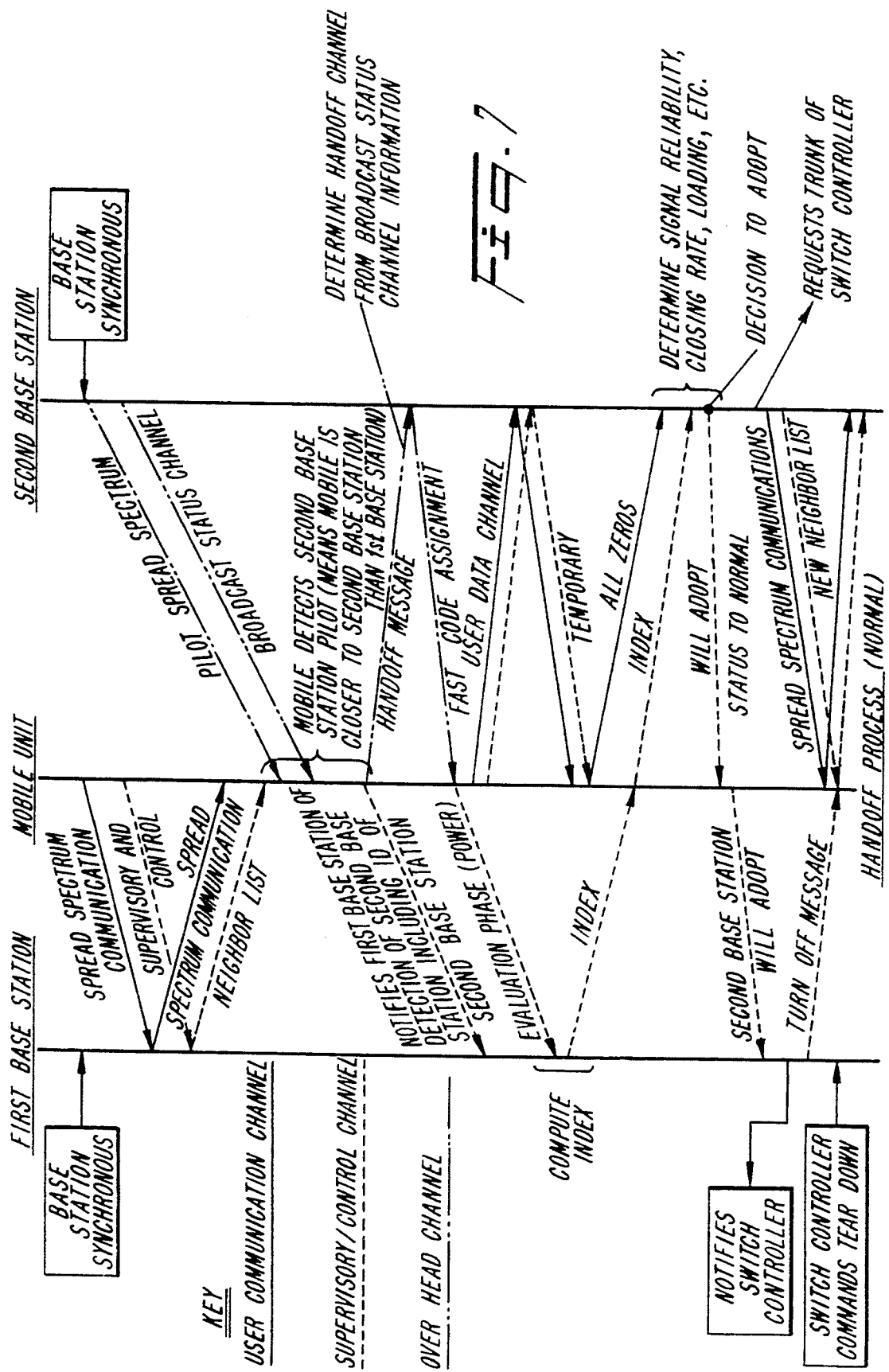

CDMA CELLULAR HAND-OFF APPARATUS AND METHOD

RELATED PATENTS

This patent issues from a continuation-in-part patent application, whose parent patent application has Ser. No. 07/727,617, with a filing date of Jul. 10, 1991, entitled, SPREAD SPECTRUM CELLULAR HAND-OFF APPARATUS AND METHOD, which is now issued U.S. Pat. No. 5,179,571. All matter from the parent patent application is incorporated herein by reference, and benefit of earlier filing date of the parent patent application is claimed pursuant to 35 U.S.C. §120.

This invention is related to the disclosures in U.S. patent application Ser. No. 07/622,235, having filing date of Dec. 14, 1990, entitled, SPREAD SPECTRUM CDMA COMMUNICATIONS SYSTEM by Donald L. Schilling; U.S. patent application Ser. No. 07/614,816, having filing date of Nov. 16, 1990, and entitled ADAPTIVE POWER CONTROL FOR A SPREAD SPECTRUM TRANSMITTER by Donald L. Schilling, which is now U.S. Pat. No. 5,093,840, with an issue date of Mar. 3, 1992; U.S. patent application Ser. No. 07/614,827, having filing date of Nov. 16, 1990, and entitled SPREAD SPECTRUM MULTIPATH RECEIVER APPARATUS AND METHOD by Donald L. Schilling, which is now U.S. Pat. No. 5,081,643, with an issue date of Jan. 14, 1992; and, U.S. patent application Ser. No. 07/626,109, having filing date of Dec. 14, 1990, and entitled SPREAD SPECTRUM COMMUNICATIONS SYSTEM AND METHOD by Donald L. Schilling; which are all incorporated herein by reference.

BACKGROUND OF THE INVENTION

This invention relates to spread-spectrum communications and more particularly to a system and method for handing off a telephone conversation from one base station to another when the mobile station is moving from one cell to another cell in a CDMA cellular spread-spectrum system.

DESCRIPTION OF THE RELEVANT ART

Many mobile communications systems employ multiple coverage areas to accommodate necessary mobile communications over a defined region. Of such systems, simulcast communication systems and cellular communication systems are the most common types which provide hand-offs between coverage areas. In simulcast communications systems, a relatively simple hand-off technique is used. Simulcast communications systems involve linking together the respective coverage areas of a plurality of communication sites to form a large wide area coverage. The simulcast communications system typically employs communication channels which are common to each individual coverage area. As a mobile radio exits the coverage area of one site and enters the coverage area of another site, a conversation on the mobile radio is maintained because the linking of the multiple sites allows for simultaneous reception and broadcasting of the conversation at each site on the same channel.

Unlike simulcast communication systems, cellular communications systems do not employ common communication channels between the various sites. Rather, each coverage area employs a number of base stations for providing radiotelephones within the base station coverage area with a number of radiotelephone communication channels which are unique with respect to adjacent base station coverage areas. Each base station within the cellular communications systems is controlled by the system's central switch controller.

A hand-off between two base stations in the present frequency-division-multiple-access (FDMA) cellular communications system may be accomplished through communication between the radiotelephone and the radio equipment at the base station from which the radiotelephone is exiting. The base station equipment periodically measures the signal strength of the radio telephone during the conversation, and, once the signal strength reaches a relatively low signal strength threshold, the same base station equipment, working with the central switch controller, sends a message to the adjacent base stations to determine which base station the radiotelephone is entering. The radio telephone is then instructed by the central switch controller to communicate on a selected channel from the base station equipment associated with the coverage area the radiotelephone is entering. This hand-off method may result in an occasional clicking sound in the voice conversation, or may result in the loss of significant amounts of data if the signals are carrying data.

A cellular spread-spectrum code-division-multiple-access (CDMA) system communicates using message data, which may require continuous, uninterrupted communications. When a mobile station moves from a first cell to a second cell, the chip-codeword used for spread-spectrum processing the channel containing the digital data has to be handed-off so as to not interrupt communications. The hand-off method used for the cellular voice communications system employing frequency modulation (FM) channels may not work for a spread-spectrum CDMA system because the time required to acquire synchronization of the new sequence may result in the loss of considerable digital data. In addition, for certain applications, the CDMA system could employ cells which may be placed close to one another, e.g. 1000 feet apart. In such a case, since the handing-off occurs more frequently if the radiotelephone is in a fast moving vehicle, the switching time is far more critical than when the cells are 3 miles apart, which is typical for present FDMA systems.

Accordingly, a system for providing a hand-off between coverage areas in a spread-spectrum-CDMA system is needed which overcomes the aforementioned deficiencies.

OBJECTS OF THE INVENTION

A general object of the present invention is to provide a cellular direct sequence spread-spectrum-CDMA-communications system which overcomes the foregoing shortcomings.

A more particular object of the present invention is to provide a cellular spread-spectrum-CDMA-communications system which ensures that a radiotelephone hand-off is achieved without loss of data.

Additional objects of the present invention include providing an improved radiotelephone, an improved base site and an improved switch controller which operate in accordance with the cellular spread-spectrum-CDMA-communications system of the present invention.

SUMMARY OF THE INVENTION

The present invention broadly includes a method for controlling hand-off in a spread-spectrum-CDMA-communications system for a mobile station moving from a first base station toward a second base station. The mobile station may be embodied as a radio device. The method includes the steps of transmitting, from the first base station, a first spread-spectrum-communications signal having a first chip-codeword sequence; and transmitting, from the second base station, a second spread-spectrum-communications signal having a second chip-codeword sequence. The second chip-codeword sequence of the second spread-spectrum-communications signal is different from, but time synchronized with, the first chip-codeword sequence of the first spread-spectrum-communications signal. The method further includes the steps of receiving, at the radio device, the first spread-spectrum-communications signal and the second spread-spectrum-communications signal; determining a relative time between receiving the second spread-spectrum-communications signal and the first spread-spectrum communications signal; and initiating, in response to the relative time, a hand-off for communicating between the radio device and the first base station to communicate between the radio device and the second base station.

Moreover, the present invention, as embodied and broadly described herein, includes a spread spectrum hand-off system for use between two or more cells in a cellular spread-spectrum-CDMA communications system. The hand-off system comprises control means and a plurality of cells with each cell having a base station for transmitting one or more spread-spectrum-communications signals. The present invention is illustrated, by way of example, with a radio device moving from a first cell which has a first base station, to a neighboring cell which has a second base station. The first cell is assumed to be surrounded by N-1 cells, and each of the base stations in these N-1 cells transmits a spread-spectrum generic-chip-code signal which is different from the other cells and the first cell. The generic-chip-code signals do not carry message data, so the codes used for the generic-chip-code signals may be completely determined.

There are, therefore, N of these non-information bearing generic-chip-code signals in a CDMA cellular system which has M cells (M>>N). A generic-chip-code signal is defined herein to be a signal having a generic-chip-codeword sequence. Many the generic-chip-codeword sequences are assigned to each base station, and the generic-chip-codeword sequences may include pilot-chip-codeword sequences, i.e. spread-spectrum channels without message data as described above, or spread-spectrum channels with low data rates with control information superimposed on the spread-spectrum channels, or further, spread spectrum channels having either high capacity user information or low capacity user information superimposed on the spread-spectrum channels.

The generic-chip-code signals are repeatedly used in different cells, such that cells with the same generic-chip-code signal are a maximum distance apart. This is called "chip codeword reuse". The mobile station scans the N-1 generic-chip-code signals, with the generic-chip-code signals not including message data, until the radio detects a generic-chip-code signal which produces a voltage level at an output of a detector which detects a value to cross a preset value threshold. The detected value may indicate a relative time-of-arrival time measurement, or may be a relative distance-from-base station distance measurement, or may be a detected generic-chip-code signal power level, or a combination of some or all of the above types of detected values, i.e. relative time-of-arrival, relative distance-from-base station, or signal power level. The generic-chip-code-signal which meets this criteria is deemed to originate from a second cell which has a second base station.

The first base station transmits a first spread-spectrum-communications signal with a first generic-chip-code signal embedded therein. The second base station transmits a second spread-spectrum-communications signal with a second generic-chip-code signal embedded therein. The spread-spectrum-CDMA-communications system has control means for switching between message and signalling data, which are spread-spectrum processed with a first set of message-chip-code signals embedded in the first spread-spectrum-communications signal transmitted from the first base station, to being spread-spectrum processed with a second set of message-chip-code signals and embedded in the second spread-spectrum-communications signal transmitted from the second base station.

Operating within a cell is a plurality of mobile user devices with each having a cellular antenna, first generic-detection means, second generic-detection means, comparator means, message-spread-spectrum-processing means, message-detection means, chip-codeword-synchronization means, and mobile control means. The first generic-detection means is coupled to the cellular antenna and has first generic-spread-spectrum-processing means. The first generic-detection means detects the first generic-chip-code signal embedded in the first spread-spectrum-communications signal communicated from the first spread-spectrum-base station. After detection of the first generic-chip-code signal, the first generic-detection-means outputs a first detected signal. The second generic-detection means is coupled to the cellular antenna and includes second generic-spread-spectrum-processing means. The second generic-detection means detects the second generic-chip-code signal embedded in the second spread-spectrum-communications signal communicated from the second spread-spectrum-base station. After detection of the second generic-chip-code signal the second generic-detection means outputs a second detected signal. The comparator means generates a comparison signal by comparing the first detected signal with the second detected signal. The comparison, in a preferred embodiment, includes determining a relative time of arrival between the second detected signal and the first detected signal, by comparing the time of arrival of the second detected signal with the time of arrival of the first detected signal. In an alternate embodiment, the comparison includes determining a relative distance-from-base-station using the time of arrival between the second detected signal and the first detected signal, by comparing the time of arrival of the second detected signal with the time of arrival of the first detected signal. Another alternate embodiment has the comparison include determining a relative power level between the second detected signal and the first detected signal, by comparing the power level of the second detected signal with the power level of the first detected signal.

By repetitively changing the generic-chip-code signal used by the second generic-detection means, the N-1 spread-spectrum-communications signals are effectively scanned. Thus, the second detected signal can be a voltage level, derived from the comparing step, which is proportioned in time, in distance, or in power level, respectively, to the N-1 generic-chip-code signals emanating from the N-1 neighboring base stations detected by determining relative time-of-arrival, relative distance, relative change in distance, or relative power level, respectively.

Furthermore, the step of comparing can also be implicit in that, if distances are the only values scanned for mobile stations with distances less that the distance to the first base station, the mobile stations that are detected are probably better candidates than the mobile stations in the current link. The determination that there is a more desirable candidate, on the basis of the criteria described above, can be made at the mobile station and at either base station, or alternately at the switch controller if all the information is made available to the selected decision point.

Having detected a candidate user radio device for possible hand-off, the control means notifies the candidate user radio device to select a generic-chip-code sequence to carry bearing data for transmitting the bearing data. The second base station despreads the transmitted generic-chip-code signal and the second base station responds by assigning a generic-chip-code signal channel as a supervisory control channel for bearing data including hand-off information and for passing the hand-off information between the first base station and the second base station or between the mobile station and either the first base station or the candidate second base station. The hand-off information can thus be conveyed to the mobile station and to the switch controller by either of the base stations.

When the second base station determines if it should adopt the mobile station, the second base station sends a message to the mobile station indicating that the second base station will serve as a parent device to the mobile station. The second base station then sends a message through the mobile station to the first base station indicating to the first base station that the second base station is ready for a hand-off of the mobile station. The first base station notifies the switch controller, and the switch controller switches the information channel over to the second base station as well as indicates to the first base station that the first base station is to remove the link from the first base station to the mobile station.

Upon receiving the chip codewords from the first base station, the message-spread-spectrum-processing means at the mobile station breaks communications with the first base station, and the first base station further communicates with the mobile station only through the second base station.

If required, the chip-codeword-synchronization means at the mobile station synchronizes the message-spread-spectrum-processing means and the detection means to the second generic-chip-code signal. Resynchronization may not be required if all the base stations are synchronized to a common clock or timing signal. Accordingly, the message-spread-spectrum-processing means at the mobile station despreads the second spread-spectrum-communications signal transmitted from the second base station. At this point the second generic-spread-spectrum-processing means is locked onto the second generic-chip-code signal and the first generic-spread-spectrum-processing means is used for repetitively searching for a generic-chip-code signal emanating from a neighboring cell and meeting the criteria for hand-off.

The present invention also includes a method for controlling hand-off in a spread-spectrum-CDMA-communications system of a radio device moving from a first cell having a first base station which transmits a first spread-spectrum-communications signal with a first generic-chip-code signal embedded therein, toward a second cell having a second base station which transmits a second spread-spectrum-communications signal with a second generic-chip-code signal embedded therein. The spread-spectrum-CDMA-communications system has a control unit for switching message data, spread-spectrum processed with a first set of message-chip code signals embedded in the first spread-spectrum-communications signal transmitted from the first base station, to the second spread-spectrum-communications signal spread spectrum processed with a second set of message-chip-code signals transmitted from the second base station.

The method has the step of scanning a plurality of generic-chip-code signals until a generic-chip-code signal which produces a time of arrival at an output of a detector, with the generic-chip-code signal, when compared to the time of arrival of the first generic-chip-code signal, having a shorter in time of arrival, i.e. with the second base station being closer to the mobile station than the first base station, and having a greater power level than the other scanned generic-chip-code signals, and also crosses, e.g. exceeds, a preset value threshold. The generic-chip-code signal that meets this criteria is labeled the second generic-chip-code signal.

The method includes detecting the first generic-chip-code signal embedded in the first spread-spectrum-communications signal communicated from the first base station, detecting the second generic-chip-code signal embedded in the second spread-spectrum-communications signal communicated from the second base station and outputting a first detected signal and a second detected signal, respectively. The method generates a comparison signal by comparing the time of arrival of the second detected signal with the time of arrival of the first detected signal. In an alternate embodiment, the method generates a comparison signal by determining a relative distance-from-base-station using the time of arrival between the second detected signal and the first detected signal, by setting the state of the second generic-chip-code which has the detector only detecting base stations closer in range than the first base station, by comparing the time of arrival of the second detected signal with the time of arrival of the first detected signal. Another alternate embodiment of the method has the method generate a comparison signal by determining a relative power level between the second detected signal and the first detected signal, by comparing the power level of the second detected signal with the power level of the first detected signal. In addition, a further embodiment only scans over distances that are less than the distance between the mobile station and the first base station.

Using message-spread-spectrum-processing means, the method despreads the spread-spectrum-communications signal as a modulated-data signal. When the comparison signal is greater than a threshold, the message-spread-spectrum-processing means uses the first generic-chip-code signal for processing the first spread-spectrum-communications signal transmitted from the first base station. When the comparison signal, by way of example, is initially detected, then first hand-off data is sent as signalling data from the mobile station to the first base station and to the second base station. After successfully completing quality measurements on the links between the mobile station and each of the first base station and the second base station, with the second base station indicating that the second base station is ready to adopt the mobile station, the first base station then notifies control means to hand-off the mobile station to the second base station. One or more chip codewords are sent from the control means through the first base station to the mobile station. The mobile station then breaks communications with the first base station and initiates spread-spectrum communications with the second base station, using the one or more chip codewords received from the control means. Through the second base station, the generic-spread-spectrum-processing means at the mobile station uses the second generic-chip-code signal for receiving the second spread-spectrum-communications signal transmitted from the second base station.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 6 is an expanded diagram of a message portion of a radio device;

FIG. 7 is a timing diagram of a protocol; and

DETAILED DESCRIPTION OF THE PREFERRED EMBODIMENTS

Figure 1:
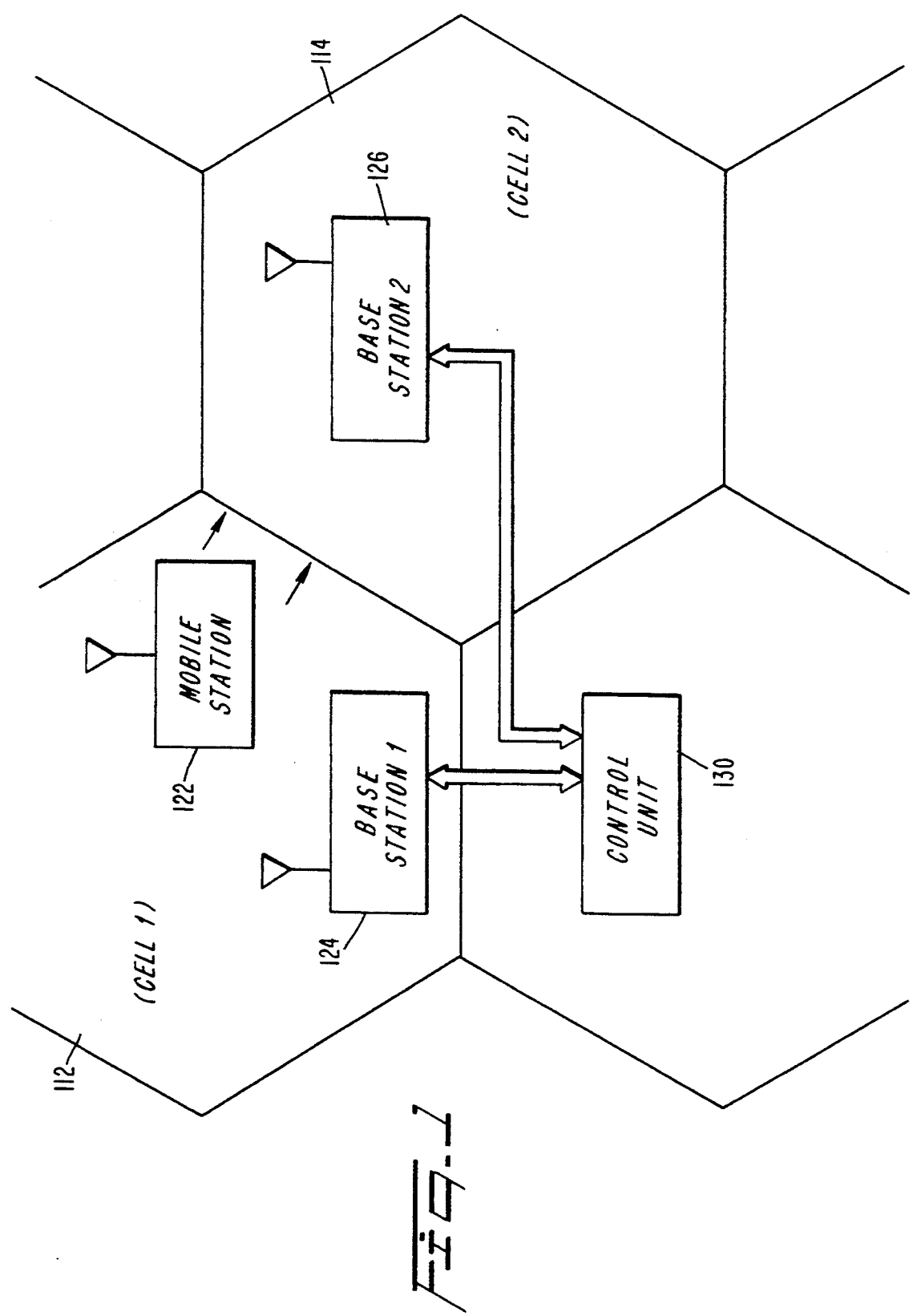
FIG. 1 is a diagram of a cellular, spread-spectrum-CDMA-communications system including two base stations and a control unit.

Reference is now made in detail to the present preferred embodiments of the invention, examples of which are illustrated in the accompanying drawings, wherein like reference numerals indicate like elements throughout the several views.

The system for controlling hand-off in a spread-spectrum-CDMA-communications system of a radio device moving between a first cell having a first base station and a plurality of cells, with each cell of the plurality of cells having a base station, and adjacent to the first cell, comprises means for transmitting, from the first base station, a first spread-spectrum-communications signal having a first chip-codeword sequence; means for transmitting in time synchronization from a plurality of base stations a plurality of spread-spectrum-communications signals with each of the plurality of spread-spectrum signals having a chip-codeword sequence different from the first chip-codeword sequence of the plurality of chip-codeword sequences; means for scanning, at the radio device, the plurality of spread spectrum-communications signals from the plurality of cells adjacent to the first cell; means for determining a relative time between receiving the first spread-spectrum-communications signal and a second spread-spectrum signal from the plurality of spread spectrum signals; and means, responsive to the relative time being compared to a time threshold, for initiating a hand-off for communicating between the radio device and the first base station to communicate between the radio device and a second base station transmitting the second spread-spectrum-communications signal. The means for initiating the hand-off may further include means for comparing the relative time to the time threshold; and means for initiating the hand-off in response to the relative time crossing the time threshold.

The system may further include means for transmitting, from the radio device, a third spread-spectrum-communications signal having a third chip-codeword sequence; means for determining, using ranging techniques with the first spread-spectrum-communications signal and the third spread-spectrum-communications signal, a relative range between the first base station and the radio device; and having the means for initiating the hand-off initiating the hand-off in response to the relative time crossing a time threshold and the relative range crossing a range threshold.

The arrangement disclosed in this specification has particular use for handing-off of radio communication in a mobile radiotelephone unit, moving from one cell to another in a cellular infrastructure of a spread-spectrum-CDMA-communications system, without loss of data bits. More particularly, the arrangement disclosed herein is directed to ensuring that an attempted hand-off of a radio unit in such an infrastructure is successful.

The present invention is illustrated, by way of example, with a radio device moving from a first cell which has a first base station, to a neighboring cell. The first cell is assumed to be surrounded by N-1 cells. Each of the base stations in these N-1 cells transmits a spread-spectrum-communications signal using a chip-code signal which is different from the other cells and the first cell.

All the base stations at the cells transmit the spread-spectrum communication signal at the same carrier frequency. The spread-spectrum communications signals may be transmitted continuously without interruption or in a time division multiple access (TDMA) mode. The radio devices typically all transmit at a second carrier frequency which is different from the carrier frequency used by the base stations. The radio devices may transmit on the same carrier frequency, however, as might be used in a TDMA mode.

The radio device scans the N-1 generic-chip-code signals of the neighboring cells. The scanning continues, in a preferred embodiment, until the time of arrival, compared to the first generic-chip-code signal of the detector which detects the scanned generic-chip-code signals, is lesser than a time threshold or the time of arrivals of the other scanned generic-chip-code signals.

In an alternate embodiment, the scanning continues until the distance from the detector, compared to the first generic-chip-code signal of the detector which detects the scanned generic-chip-code signals, is closer than a distance threshold or the distances of the other scanned generic-chip-code signals.

In a further embodiment, when the chip-code signals of the first base station are synchronized with the chip-code signals from the other base stations, the scanning is performed only during the interval that the codes are arriving from the base stations within a shorter range than the range from the first base station. Therefore, when a predetermined power level is detected, the base stations transmitting at least the predetermined power level are considered good candidates for further evaluation for hand-offs.

Another alternate embodiment has the scanning continue until the power level, compared to the first generic-chip-code signal of the detector which detects the scanned generic-chip-code signals, is greater than a power level threshold or the power levels of the other scanned generic-chip-code signals.

In addition, in one embodiment, the scanning may be limited to cover only ranges within the range of the first cell. Alternatively, the scanning may continue until the output voltage level of the detector which detects the scanned generic-chip-code signals crosses a preset value threshold and is greater than the output voltage levels of the other scanned generic-chip-code signals. The generic-chip-code signal which meets one of these criteria is deemed to originate from a second cell which has a second base station.

FIG. 1 illustrates a unique cellular spread-spectrum-CDMA-communications system which, in simplified form, includes a first base station 124 and a second base station 126 for two geographic spread-spectrum-CDMA communications areas, i.e. cells 112, 114, respectively. In a preferred embodiment six cells are adjacent to a given cell, as shown for the second cell 114. Each cell adjacent to the given cell, i.e. the second cell 114, uses a different chip codeword from the second cell 114 and from each other. This permits reuse of chip codewords.

Figure 2:
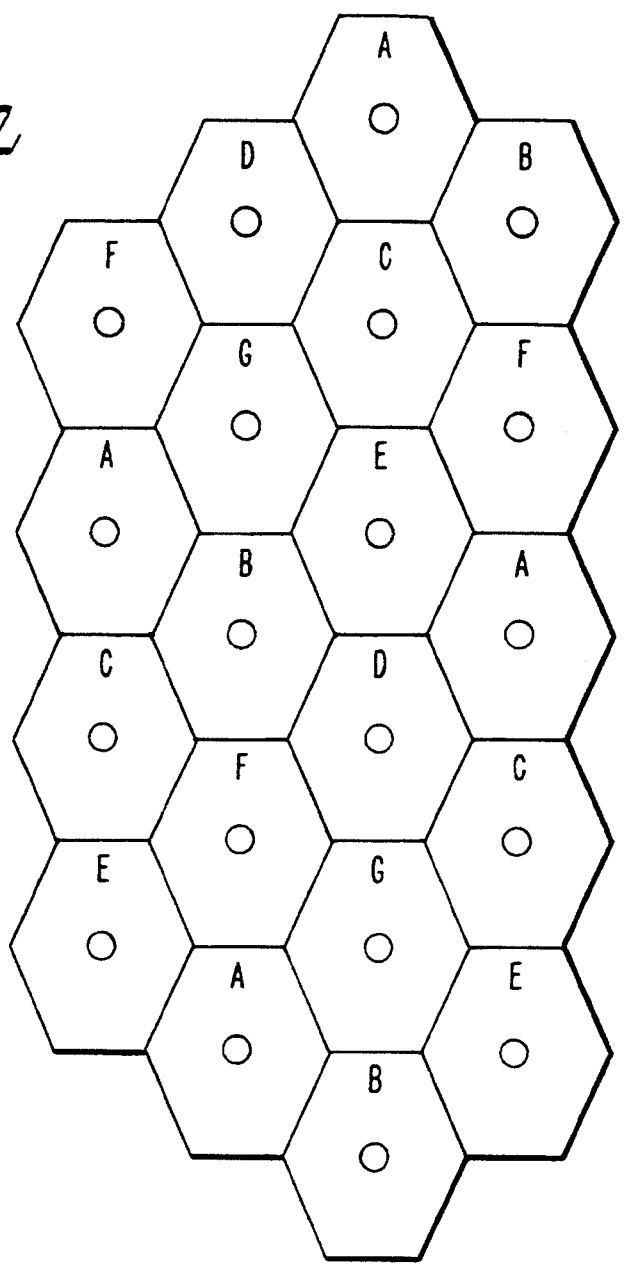
FIG. 2 is a diagram of cellular, spread-spectrum CDMA showing a typical example of chip codeword reuse.

FIG. 2 illustrates generic chip codeword reuse in a cellular CDMA environment, where the N-1 cells adjacent to a particular cell using generic chip codeword A, use N-1 different generic chip codewords, respectively. There are N generic-chip-code signals used in a CDMA cellular system which has a total of M cells (M>>N). The generic-chip-code signals are repeatedly used in the cells, such that the cells with the same generic-chip-code signals are a maximum distance apart, and no two adjacent cells use the same generic-chip-code signal. FIG. 2 shows for N=7 there are six adjacent cells using six different generic chip codewords, B, C, D, E, F and G. This pattern is repeated throughout the cellular geographic area. If a sufficient number of codewords are available, the reuse of chip codewords may be expanded to the next adjacent cells.

Referring to FIG. 1, for the first cell 112, the first base station 124 includes first transmitting means, embodied as a first spread-spectrum transmitter, for transmitting a first spread-spectrum-communications signal with a first generic-chip-code signal embedded therein. The first base station 124 also has first receiving means, embodied as a first spread-spectrum receiver, for receiving a spread-spectrum-communications signal, with the first generic-chip-code signal embedded therein. For the second cell 112, the second base station 124 includes second transmitting means, embodied as a second spread-spectrum transmitter, for transmitting a second spread-spectrum-communications signal with a second generic-chip-code signal embedded therein. The second base station 124 also includes second receiving means, embodied as a second spread-spectrum receiver, for receiving a spread-spectrum-communications signal, with the second generic-chip-code signal embedded therein. The generic-chip-code signals for transmitting and receiving at a particular base station may be the same or different.

The spread-spectrum-CDMA-communications system has control means, embodied as a control unit 130, for switching message and signaling data, spread-spectrum processed with a message-chip-code signal embedded in the first spread-spectrum-communications signal transmitted from the first base station, to the second spread-spectrum-communications signal transmitted from the second base station.

Each of the base stations in each cell of FIG. 2 transmits in time synchronization with each other. By way of example, the first generic-chip-code signal is in time synchronization with the second generic-chip-code signal. Similarly, the first generic-chip-code signal and the second generic-chip-code signal are in time synchronization with the third generic-chip-code signal. Thus, each generic-chip-code signal of each base station are transmitted in time synchronization. Time synchronization can be implemented with a common clock or timing signal used by each base station. By time synchronization is meant that the first chip through $n^{th}$ chip of each generic-chip-code signal are transmitted simultaneously in time, from each base station. This permits a mobile radio unit to determine relative times of arrival of each generic-chip-code signal, or, in alternate embodiments, to determine relative distances of each generic-chip-code signal, or in another embodiment, relative power levels of each generic-chip-code signal. For each embodiment, the initiating means responds to the relative time, relative distance, or relative power, respectively, for initiating a hand off for communicating between the radio device and the first base station to communicate between the radio device and the second base station.

In a preferred embodiment, the time determining means of the radio device is embodied as a timing circuit for determining a relative time of arrival between receiving the first spread spectrum-communications signal and the second spread-spectrum-communications signal, and the initiating means is embodied as a hand-off circuit for initiating the hand-off in response to the relative time crossing a time threshold. In addition, the radio device may include, in another embodiment, range determining means, embodied as a ranging circuit, for using ranging techniques with the first spread-spectrum-communications signal and the third spread-spectrum-communications signal, for determining a relative range between the first base station and the radio device, with the hand-off circuit including means for initiating the hand-off in response to the relative time crossing a time threshold and the relative range crossing a range threshold.

For purposes of exemplifying the hand-off operation of the present invention, a mobile station 122 which has an improved radio device is depicted in transition from the first cell 112 to the second cell 114. Overall control of the first base station 124 and the second base station 126 is provided by a signal processing unit of a cellular switch controller, located in a control unit 130.

Figure 3:
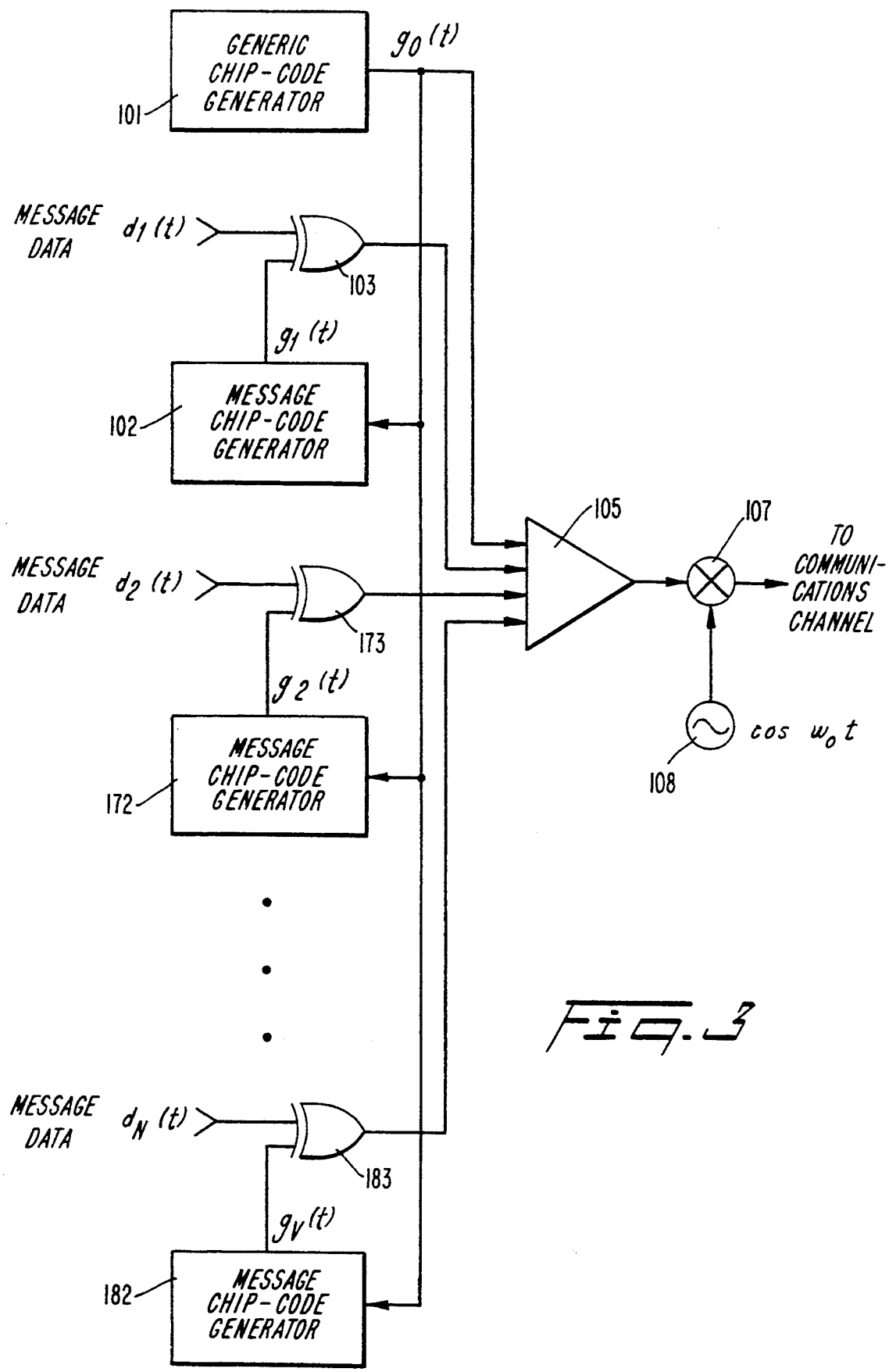
FIG. 3 shows a synchronous spread-spectrum transmitter at a base station.

Each base station and mobile station has respective transmitting means, embodied as a respective transmitter, for transmitting the spread-spectrum-communications signal, which may include a plurality of spread-spectrum-processed signals for handling a plurality of message and signalling data. The transmitter is coupled to a plurality of message means and a plurality of spreading means. Referring to FIG. 3, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. The plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message and signalling data $d_1(t)$, $d_2(t)$, ..., $d_N(t)$ with the plurality of message-chip-code signals $g_1(t)$, $g_2(t)$, ..., $g_N(t)$, respectively. More particularly, the message data, $d_1(t)$, are modulo-2 added with the first message-chip-code signal, $g_1(t)$, the signalling data, $d_2(t)$, are modulo-2 added with the second message-chip-code signal, $g_2(t)$, through the $N^{th}$ message and/or signalling data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message and signalling data, $d_1(t)$, $d_2(t)$, ... $d_N(t)$. The generic-chip-code signal $g_0(t)$, in a preferred embodiment, provides synchronous timing for the plurality of message-chip-code signals $g_1(t)$, $g_2(t)$, ..., $g_N(t)$, and the plurality of message and signalling data $d_1(t)$, $d_2(t)$, ..., $d_N(t)$.

The combiner 105 combines the generic-chip-code signal and the plurality of spread-spectrum-processed signals, by adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos \omega_o t$, at a carrier frequency, $f_o$, where $\omega_o = 2\pi f_o$. The modulated generic-chip-code signal and the plurality of spread-spectrum processed signals are transmitted over the communications channel as a spread-spectrum-communications signal, $x_c(t)$. While the transmitter may use a linear power amplifier for optimum performance, a nonlinear power amplifier also may be used without significant degradation or loss in performance.

For the spread-spectrum-CDMA-communications system, illustrated in FIG. 1, the first spread-spectrum-communications signal, $x_{c1}(t)$, transmitted from the first base station has the form:

$$x_{c1}(t) = \left\{ g_{10}(t) + \sum_{i=1}^{N} [g_{1i}(t) + d_{1i}(t)] \right\} \cos\omega_o t$$

Thus, the first spread-spectrum-communications signal includes the first generic-chip-code signal, $g_{10}(t)$, and a first plurality of spread-spectrum-processed signals, for $i=1, \ldots, N$, as if they were each modulated separately, and synchronously, on separate carrier signals with the same carrier frequency, $f_o$, and transmitted over the communications channel.

Similarly, the second spread-spectrum-communications signal, $x_{c2}(t)$, transmitted from the second base station 126 has the form:

$$x_{c2}(t) = \left\{ g_{20}(t) + \sum_{j=1}^{M} [g_{2j}(t) + d_{2j}(t)] \right\} \cos\omega_o t$$

Thus, the second spread-spectrum-communications signal includes the second generic-chip-code signal, $g_{20}(t)$, and a second plurality of spread-spectrum-processed signals, for $j=1, \ldots, M$, as if they were each modulated separately, and synchronously, on separate carrier signals with the same carrier frequency, $f_o$, and transmitted over the communications channel.

Figure 4:
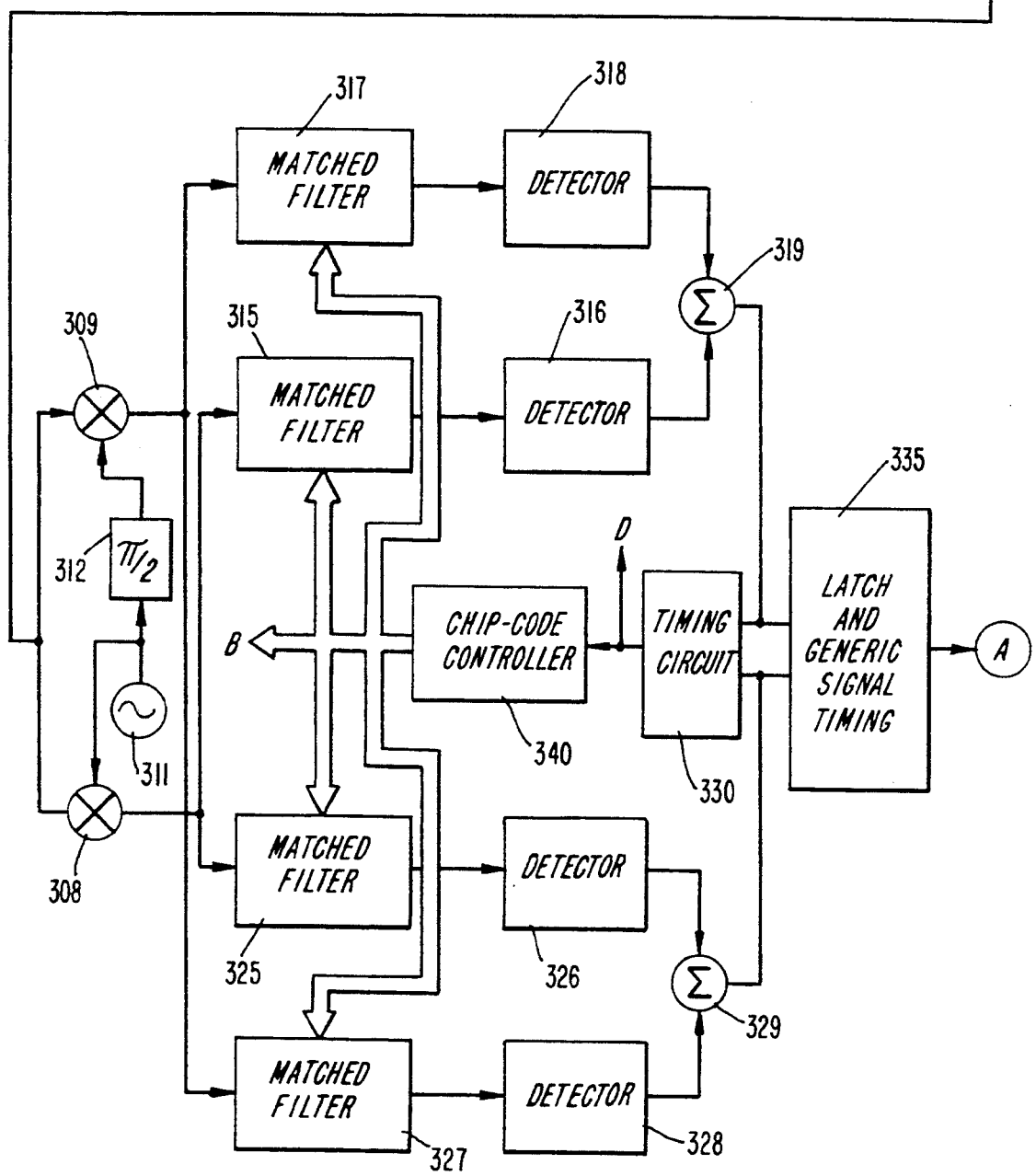
FIG. 4 is an expanded diagram of the radio device for the mobile station.

The improved mobile-user, hand-held, radio device for the mobile station 122 includes a cellular antenna, first generic-detection means, second generic-detection means, comparator means, control means, message-spread-spectrum-processing means, message-detection means and synchronization means. In FIG. 4, elements of the radio device, by way of example, are shown in expanded form. A cellular antenna 301 is coupled through a low noise amplifier (LNA) 303, down converter 305 and automatic gain control (AGC) 307 to a first receiver mixer 308 and a second receiver mixer 309. The first receiver mixer 308 is coupled to a signal source 311, and the second receiver mixer 309 is coupled through a 90° phase shifter 312 to the signal source 311. The first receiver mixer 308 multiplies the local signal from the signal source 311 with a received signal to generate an in-phase signal. The second mixer 309 multiplies the 90° phase-shifted version of the local signal from the signal source 311 with the received signal to generate a quadrature-phase signal.

Figure 5:
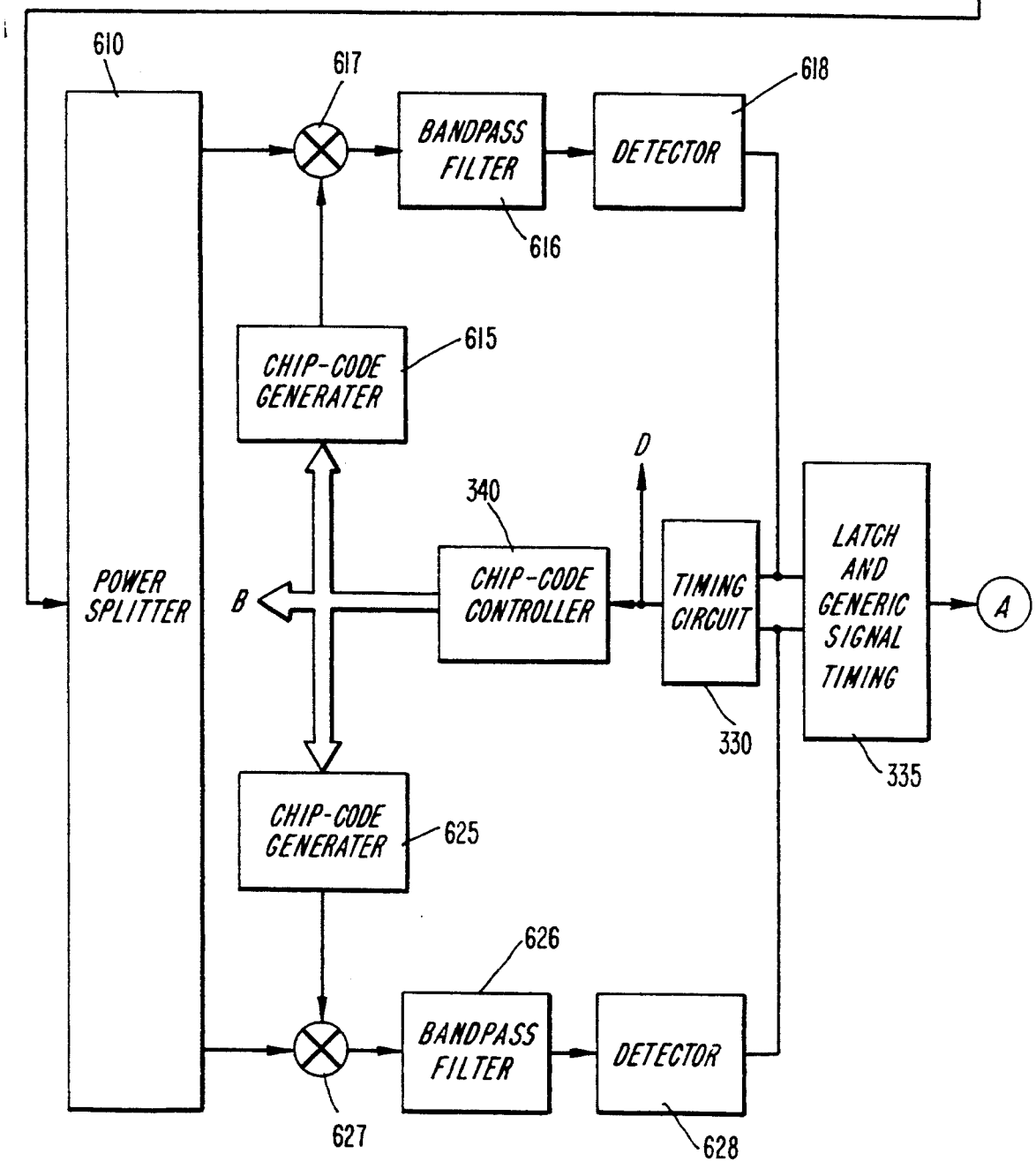
FIG. 5 is an expanded diagram of the radio device for the mobile station.
Figure 8A:
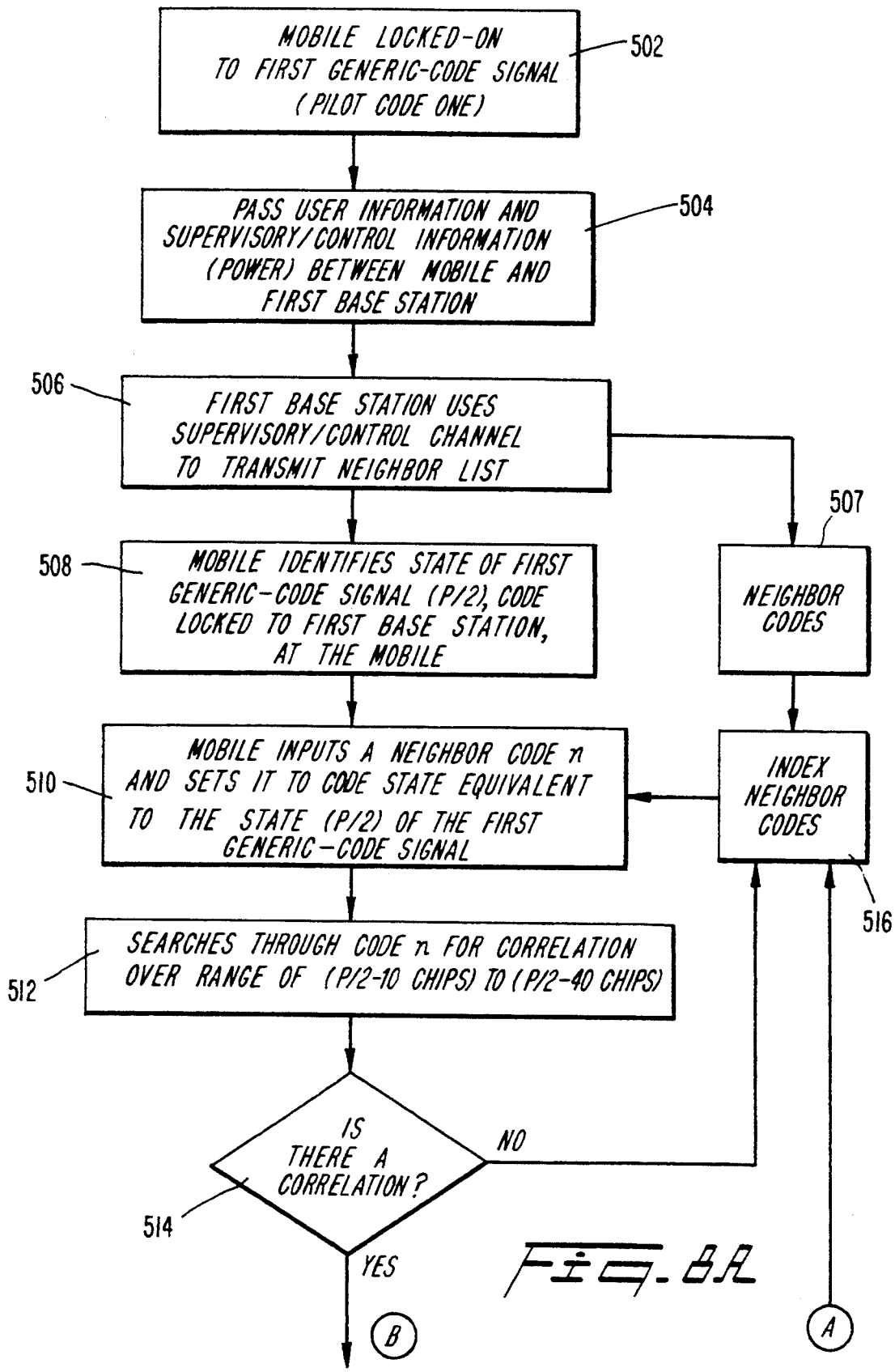
FIGS. 8A–8D comprise a flowchart of a method for handing off between two cellular base stations.
Figure 8B:
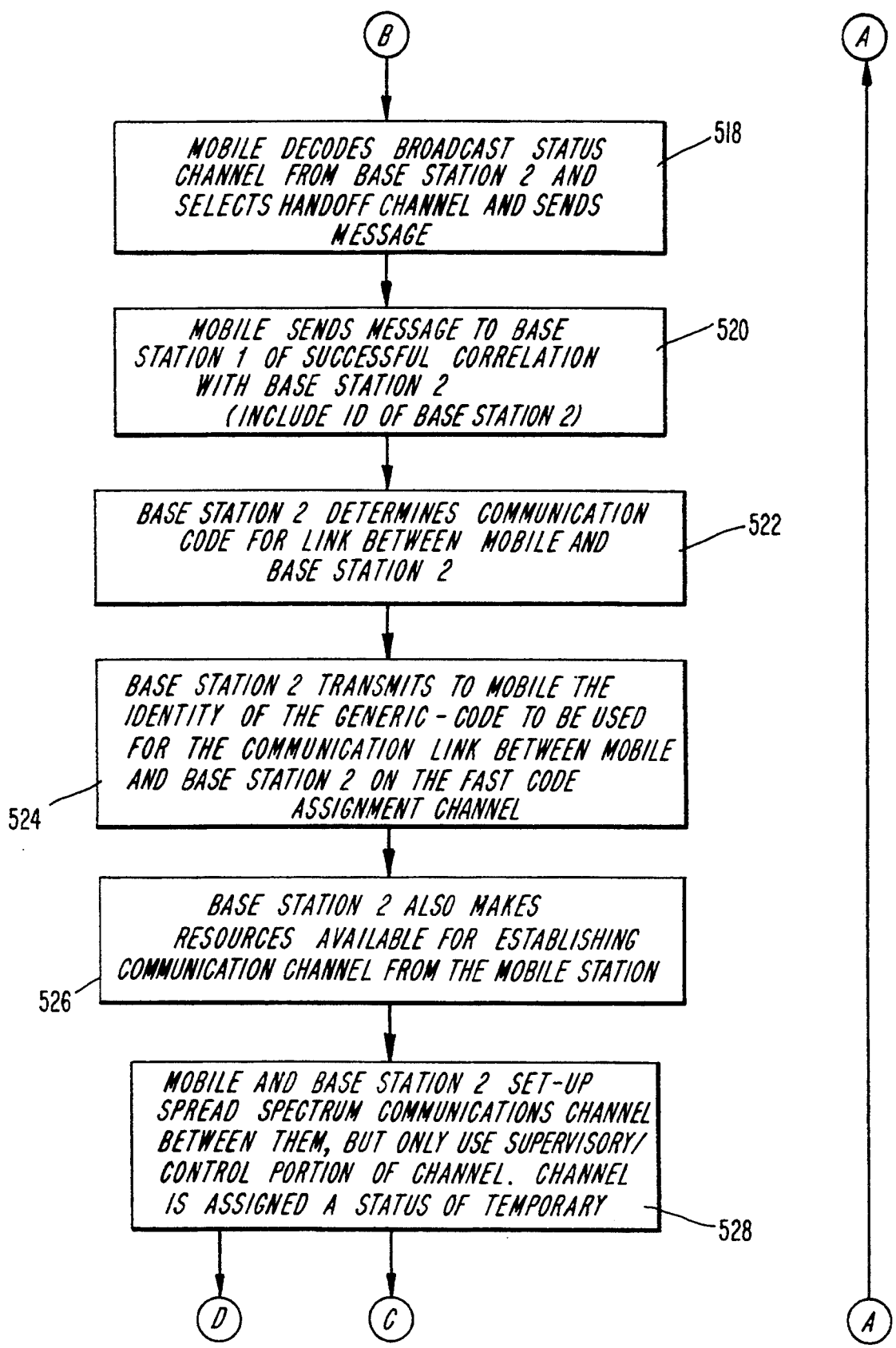
Figure 8C:
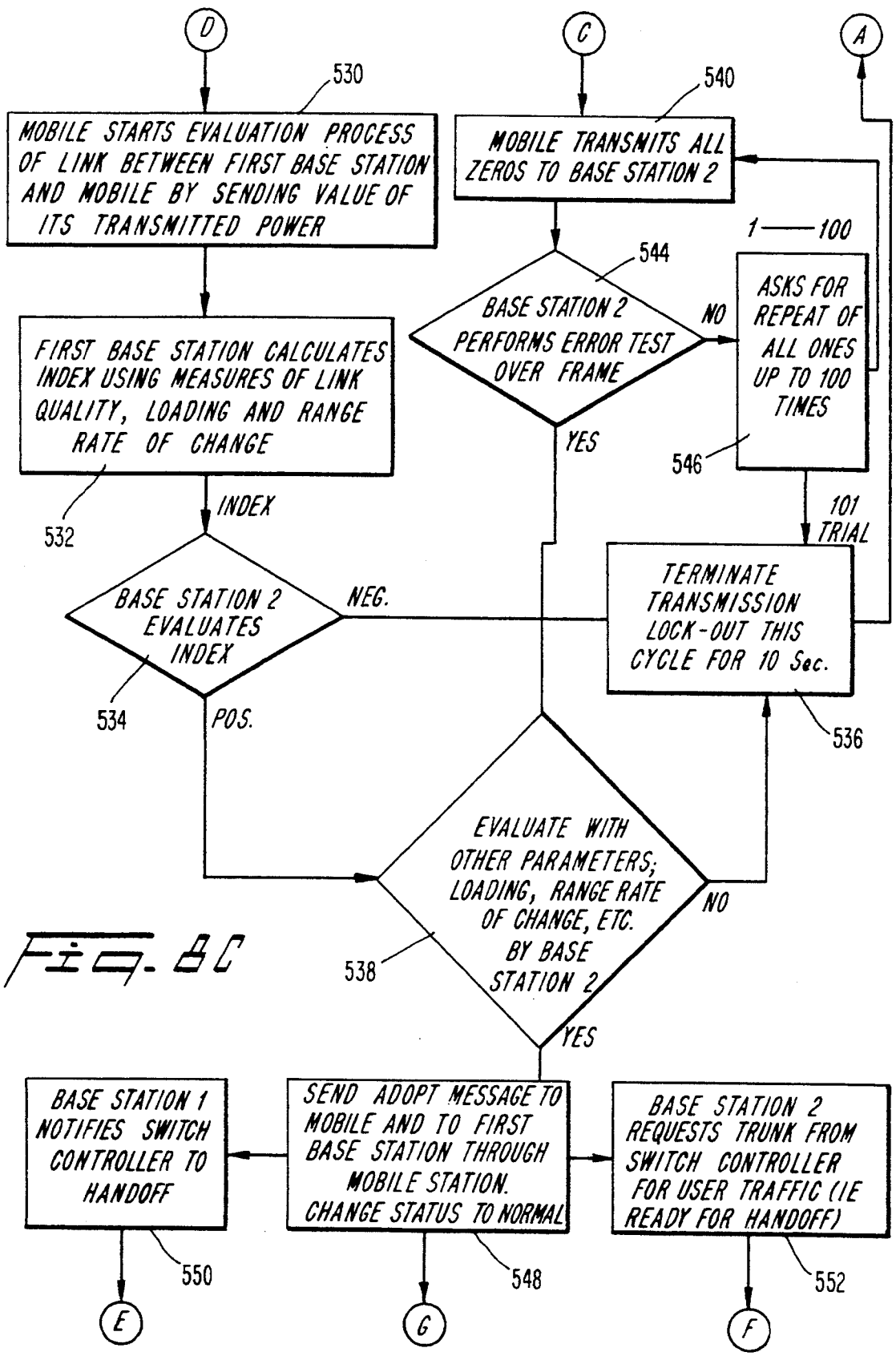
Figure 8D:
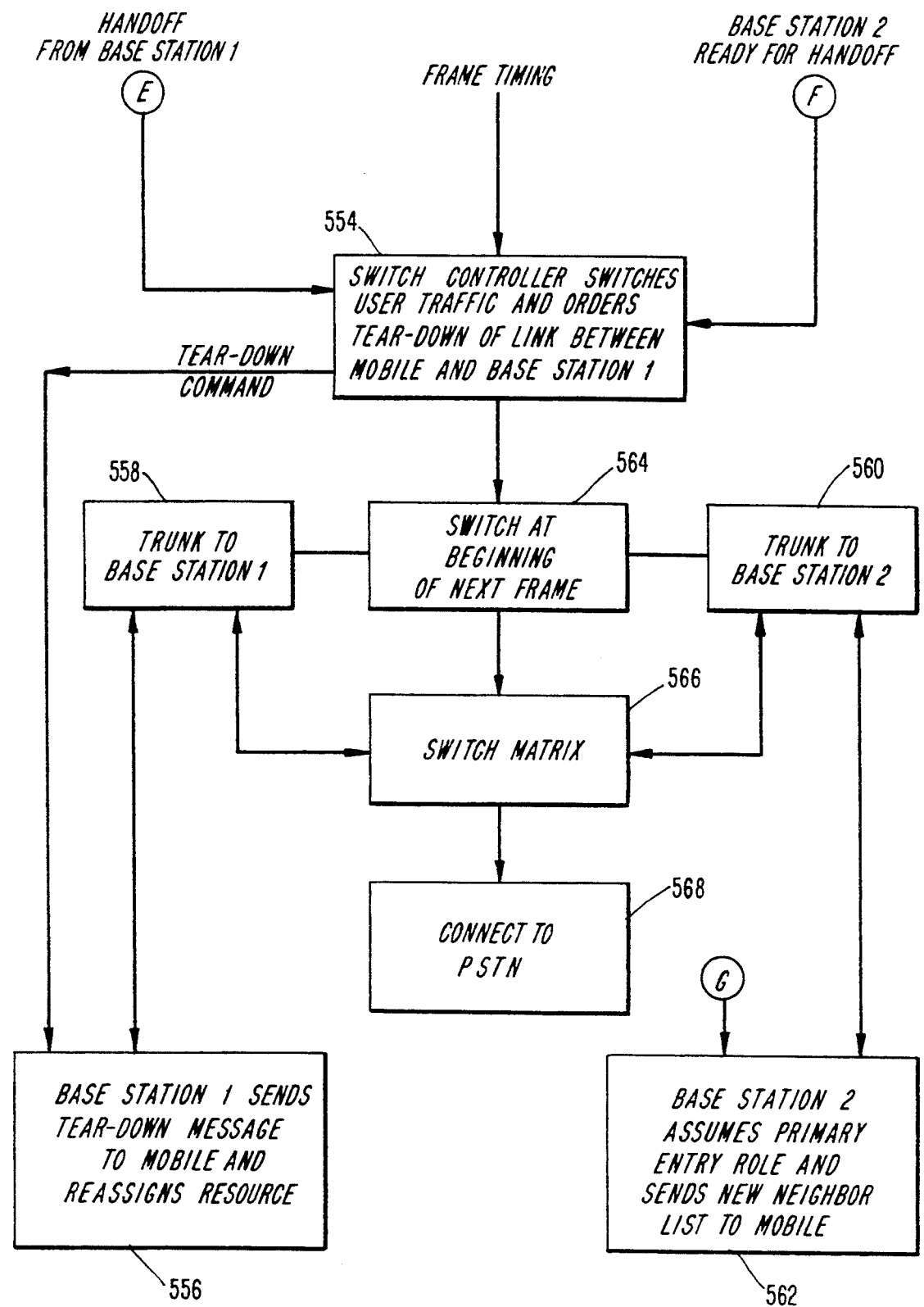

The first generic-detection means and the second generic-detection means as illustrated in FIG. 5 may be embodied using a correlation receiver such as a first and second generic-chip-code generator 615, 625, first and second mixer 617, 627 and first and second bandpass filter 616, 626, or, as illustrated in FIG. 4, may be embodied using a second and fourth matched filter 325, 327 and a second and fourth detector 326, 328. The generic-chip-code generators and matched filter typically are programmable or adjustable, for adapting to different generic-chip-code signals embedded in spread spectrum-communications signals, transmitted from each base transmitter in different cells.

The controller means, embodied as a chip-code controller 340, sets which generic-chip-code signal the correlation receiver or matched filter is using. The chip-code controller 340 can repetitively change the generic-chip-code signal used by the correlations receiver or matched filter, so as to effectively scan through a plurality of generic-chip-code signals. In the cellular architecture of FIG. 1, the scanning would move through N-1=5 generic-chip-code signals which correspond to the five neighboring cells.

The first generic-detection means is shown in FIG. 4, by way of example, embodied as including at least a first matched filter 315 and a first detector 316, and may further include a third matched filter 317 and a third detector 318. The first matched filter 315 is coupled between the first receiver mixer 308 and the first detector 316, and the third matched filter 317 is coupled between the second receiver mixer 309 and the third detector 318. The outputs of the first detector 316 and the third detector 318 are combined by first combiner 319. The first matched filter 315 and the third matched filter 317 have an impulse response matched to the first generic-chip-code signal. For the particular combination shown, the first matched filter 315 and first detector 316 detect the in-phase component of the received, first generic-chip-code signal. The third matched filter 317 and third detector 318 detect the quadrature-phase component of the received, first generic-chip-code signal.

A spread spectrum correlator may be used in place of a matched filter. The first generic-detection means is shown in FIG. 5 as a spread-spectrum correlator includes a first generic-chip-code generator 615, first generic mixer 617, first generic-bandpass filter 616 and first generic detector 618.

The second generic-detection means is shown in FIG. 4 embodied as including at least a second matched filter 325 and a second detector 326, and may further include a fourth matched filter 327 and a fourth detector 328. The second matched filter 325 is coupled between the first receiver mixer 308 and the second detector 326, and the fourth matched filter 327 is coupled between the second receiver mixer 309 and the fourth detector 328. The outputs of the second detector 326 and the fourth detector 328 are combined by second combiner 329. The second matched filter 325 and the fourth matched filter 327 have impulse responses matched to the second generic-chip-code signal. For the particular combination shown, the second matched filter 325 and second detector 326 detect the in-phase component of the received, second generic-chip-code signal. The fourth matched filter 327 and the fourth detector 328 detect the quadrature-phase component of the received, second generic-chip-code signal.

A spread spectrum correlator may be used in place of a matched filter. Thus, the first generic-detection means is shown in FIG. 5 as a spread-spectrum correlator including a second generic-chip-code generator 625, second generic mixer 627, second generic-bandpass filter 626 and second generic detector 628.

The comparator means may be a comparator 330. The comparator 330 may be embodied as a differential amplifier, which produces a comparison signal at D. The comparator 330 is coupled to the output of the first combiner 319 and the output of the second combiner 329.

The first matched filter 315 and the first detector 316, along with the third matched filter 317 and the third detector 318, detect the first generic-chip-code signal embedded in the first spread-spectrum-communications signal, which is communicated from the first base station. The outputs of the first detector 316 and third detector 318 are combined by first combiner 319, and the detected first generic-chip-code signal is outputted as a first detected signal. The second matched filter 325 and the second detector 326, along with the fourth matched filter 327 and the fourth detector 328, detect the second generic-chip-code signal sequentially and repetitively N-1 generic-chip-code signals until the generic-chip-code signal which produces a voltage level at an output of the second combiner 329 is greater than the other scanned generic-chip-code signals and also crosses a preset value threshold. The generic-chip-code signal which meets this criteria is deemed to originate from the second spread-spectrum-communications signal, which is communicated from the second base station. The output of the second detector 326 and fourth detector 328 are combined by second combiner 329, and the detected second generic-chip-code signal is outputted as a second detected signal.

The comparator 330 compares the first detected signal with the second detected signal, and outputs a comparison signal. In a preferred embodiment, the comparator 330 compares the time of arrival of the second detected signal with respect to the first detected signal. The comparison signal accordingly represents a relative time between the second detected signal with respect to the first detected signal. Since each spread-spectrum-communications signal is transmitted in time synchronization, the relative time, accordingly, is the time between receiving the second spread-spectrum-communications signal and the first spread-spectrum-communications signal. This comparison can be performed by appropriate timing and logic circuits, or a processor. The design of the timing and logic circuits, or programming of a processor to perform the comparison, is well known in the art. The comparison, alternatively or in addition, may be performed, for example, by subtracting the second detected signal from the first detected signal, using a differential amplifier.

In an alternate embodiment, the comparison includes determining a relative distance-from-base-station using the time of arrival between the second detected signal and the first detected signal, by comparing the time of arrival of the second detected signal with the time of arrival of the first detected signal. Another alternate embodiment has the comparison include determining a relative power level between the second detected signal and the first detected signal, by comparing the power level of the second detected signal with the power level of the first detected signal.

When the comparison signal is greater than a preset value threshold, the message-spread-spectrum processing means uses the first generic-chip-code signal for processing the first spread-spectrum-communications signal transmitted from the first base station. When the comparison signal is less than the preset value threshold, the message-spread-spectrum-processing means uses the second generic-chip-code signal for processing the second spread-spectrum-communications signal transmitted from the second base station.

As a function of the comparison signal, or relative time, the radio device can initiate hand-off for communicating between the radio device and the first base station to communicate between the radio device and the second base station. For example, when the comparison signal is compared to a time threshold, hand-off from the first base station to the second base station can be initiated when the comparison signal crosses the time threshold.

If a common clock or timing signal is used by all the base stations, then chip-codeword-synchronization means is not required. If a common clock or timing circuit is not used, then chip-codeword synchronization means is required. Many combinations of circuit elements may be used to accomplish the function of the chip-codeword-synchronization means. FIGS. 4 and 5 show, by way of example, a chip-codeword controller 340. The chip-codeword controller 340, in response to the comparison signal being greater than a preset value threshold, can cause the message-spread-spectrum-processing means to despread a received spread-spectrum signal using a first message-chip-code signal. The first message-chip-code signal is assumed the appropriate chip-code signal using the chip codewords for despreading a desired spread-spectrum channel in the first spread-spectrum-communications signal communicated from the first base station. When the comparison signal is less than the preset value threshold, the chip-codeword controller 340 can cause the message-spread-spectrum-processing means to despread a received spread spectrum signal using a second message-chip-code signal. The second message-chip-code signal is assumed the appropriate chip-code signal using the chip codeword for despreading the desired spread-spectrum channel in the second spread-spectrum-communications signal communicated from the second base station.

The chip-codeword controller 340 can facilitate searching for a generic-chip-code signal embedded in a spread-spectrum-communications signal transmitted from a neighboring cell. Assume that the mobile station 122 is located in a first cell 112. Assume further that a total of N different generic-chip-code signals are used in the system to identify cells. Since the mobile station 122 is assumed located in the first cell 122 and operating with the first generic-chip-code signal, the mobile station 122 has a possible N-1 generic-chip-code signals through which to search. Any one of the N-1 generic-chip-code signals may be embedded in a spread-spectrum-communications signal transmitted from a neighboring cell. The chip-codeword controller 340 can sequentially rotate through the N-1 generic-chip-code signals to sequentially change the impulse response of the second and fourth matched filter 325, 327, or if a correlation receiver is used, of a second generic-chip-code generator 625 which outputs a generic-chip-code signal for mixing with a second mixer 627, the received spread-spectrum-communications signal. The chip-codeword controller 340 determines the range to the first base station by determining the time delay in the number of chips buffered in the roundtrip path between the mobile station and the first base station. If the number of buffered chips is P then the state of the first generic-chip-code at the mobile station is P/2. The other N-1 generic-chip-codes also contain a state of P/2, so while the chip-code controller 340 scans each of the N-1 generic-chip-code signals, the chip-code controller 340 begins with P/2 states equivalent to the distance to the first base station. The chip-code controller 340 counts down and scans over a limited number of states within a distance less than the current path to the first base station. When the detector detects a power level above a predetermined power level, the mobile station is closer to the second base station than the first base station, and the mobile station does not detect base stations beyond the distance to the first base station since the chip-code controller 340 prevents the correlators from scanning for possible signals corresponding to base stations beyond the first base station.

The method of the present invention is performed by the mobile station only upon receiving the generic-spread-spectrum signal from the second base station. For communicating back to the second base station, the mobile station selects one of the generic chip codes assigned to the second base station to allow the mobile station to communicate with the second base station. The mobile station sends, to the second base station, the selected generic chip code and a signal indicating that the mobile station is ready to hand-off to the second base station. The second base station responds by assigning an information bearing generic chip code channel allowing the second base station and the mobile station to pass supervisory signals to each other, while user information is also passed between the mobile station and the first base station. The mobile station also notifies the first base station that the mobile station has connected with the second base station.

The comparator means may further be embodied as part of a digital signal processor, which compares the relative time of arrival of the second detected signal for each of the N-1 generic-chip-code signals. In one alternate embodiment, the comparator means may further be embodied as part of a digital signal processor, which compares the relative distance of the second detected signal for each of the N-1 generic-chip-code signals. In another alternate embodiment, the comparator means may further be embodied as part of a digital signal processor, which compares the relative distance of the second detected signal for each of the N-1 generic-chip-code signals.

The comparator means, after detecting the second detected signal which has the closest relative value and which also surpasses, i.e. crosses, a preset value threshold, can set the chip-codeword controller 340 to "lock-on" to the corresponding generic-chip-code signal. The relative value may be a relative time of arrival, a relative distance, or a relative power level, depending on the respective embodiment. The "lock-on" can be performed by setting the impulse response of the second and fourth matched filters 325, 327 to the second detected signal. The searched and acquired generic-chip-code signal is referred to as the second generic-chip-code signal for handing-off between the first cell 112 and second cell 114.

FIG. 1 shows, by way of example, each cell having six adjacent cells. Thus, a total of seven (N=7) generic-chip-code signals are used, one for the first cell 112, and one each for the six adjacent cells. While the mobile station 122 is locked onto the first generic-chip-code signal of the first cell 112, the chip-codeword controller 340 would scan through the six generic-chip-code signals of the adjacent cells. In the preferred embodiment, the scanning would begin at a point in the generic-chip-code signals which is closer to the mobile station than to the first base station.

When the chip-codeword controller 340 is set to lock-on to the corresponding generic-chip-code signal, then through the chip-codeword controller 340 can use the first and third matched filters 315, 317 for scanning for the generic-chip-code signal which meets the criteria for the next hand-off. Thus, the chip-codeword controller 340 can flip back and forth between first generic-detection means and second generic-detection means using one for detecting the generic channel in the spread-spectrum-communication signal currently being received and the other for scanning.

FIG. 6 shows an expanded diagram of the message-spread-spectrum-processing means embodied, by way of example, as a message receiver, which can be used with the present invention. The message-spread-spectrum-processing means, as illustrated in FIG. 6, includes a first message-chip-code generator 401 and a first message mixer 403. The message-spread-spectrum-processing means additionally may include a second message-chip-code generator 405 and a second message mixer 407. The first message mixer 403 and the second message mixer 407 may be coupled through a power splitter 409 to the cellular antenna. Alternatively, only the first message-chip-code 401 generator is sufficient since the chip-codeword controller 340 can change the message-chip-code signal almost instantly with the first message-chip-code generator 401.

Also shown are electronic switch 413, bandpass filter 415, detector 417, low-pass filter 419, sampler 421 and bit synchronizer 423. The first message mixer 403 is coupled between the power splitter 409 and the electronic switch 413, and to the first message-chip-code generator 401. The second message mixer 407 is coupled between the power splitter 409 and the electronic switch 413, and to the second message-chip-code generator 405. The first message-chip-code generator 401 and the second message-chip-code generator 405 are coupled, B, to the chip-codeword controller 340 of FIGS. 4 and 5. The bandpass filter 415, detector 417, lowpass filter 419 and sampler 421 are connected in series, respectively, at the output of the electronic switch 413. A bit synchronizer 423 is connected to the lowpass filter 419 and sampler 421, and to latch and generic signal timing circuit 335 of FIGS. 4 and 5.

For the embodiment shown in FIG. 6, when the mobile station 122 is in transition from the first cell 112 to the second cell 114 of FIG. 1, the first message-chip-code generator 401 uses a replica of the first message-chip-code signal which was transmitted by a first transmitter as illustrated in FIG. 3, and located at the first base station 124. The first message-chip-code signal is used by the first transmitter to spread-spectrum process message data. Additional message-spread-spectrum-processing means may be used for receiving additional message data and signalling data channels.

As the mobile station 112 approaches the second cell 114, the comparator means detects the second detected signal which has the closest relative time and crosses the preset value threshold, the chip-codeword controller 340 sets a replica of the second message-chip-code signal to the second message-chip-code generator 405. Accordingly, the second message-chip-code generator 405 uses a replica of the second message-chip-code signal which is used with a second transmitter as illustrated in FIG. 3, and located at the second base station 126. The second message-chip-code signal is used by the second transmitter to spread-spectrum process message. The chip codeword used for generating the second message-chip-code signal is communicated to the mobile station 112 using a signalling channel, in response to the mobile station 112 sending hand-off data to the first base station. Additional message-spread-spectrum-processing means may be used and switched from using the first set of message-chip-code signals to the second set of message-chip-code signals, for receiving message data and signalling data channels.

While the mobile station 122 is located in the first cell 112, the first detector 316 and the third detector 318 detect the first generic-chip-code signal transmitted from the first transmitter, and output the first detected signal. As the mobile station 122 moves toward the second cell 114, the second detector 326 and fourth detector 328 detect the second generic-chip-code signal transmitted from the second transmitter, and output the second detected signal. As previously mentioned, the second generic-chip-code signal and consequently the second detected signal, may be derived from scanning N-1 generic-chip-code signals.

When the first detected signal is greater than the second detected signal, the comparison signal at the output of the comparator 330 is, by way of example, a positive voltage level. The electronic switch 413, accordingly, causes the message portion of the radio device to receive the despread first spread-spectrum-communications signal using the first message mixer 403. This is illustrated in FIG. 7 with the mobile station communicating with the first base station using spread spectrum communications.

The mobile station 122 continuously receives one or more spread-spectrum signals with each having a generic-chip-code signal. When the second detected signal, due to one of the detected generic-chip-code signals, is greater than the first detected signal, the comparison signal at the output of the comparator 330 is, by way of example, a negative voltage level, and the mobile station 122 initiates the protocol to change to the second base station 126. Thus, hand-off data, which indicate change base station, are sent as signalling data through a spread-spectrum channel from the mobile station 122 to the first base station 124, to hand-off the mobile station 122 to a second base station 126. In response to receiving the hand-off data, the first base station 124 notifies the control unit 130 to hand-off the mobile station 122 to the second base station 126. The control unit 130 sends the first base station 124 the one or more spread spectrum chip codewords, which are relayed to the mobile station 122. The chip codewords are communicated through a spread-spectrum channel from the first base station 124 to the mobile station 122 as signalling data. The mobile station 122 uses the spread spectrum chip codewords for communicating with the second base station 126. Upon receiving the chip codewords, the message-spread-spectrum-processing means at the mobile station 122 breaks communications with the first base station 124 and initiates spread-spectrum communications with and locks onto the second base station 126. Also, the electronic switch 413, accordingly, causes the message portion of the radio device to receive the despread second spread-spectrum-communications signal using the second message mixer 407.

Thus, depending on the setting of the electronic switch 413, the output of either the first message mixer 403 or the second message mixer 407 is filtered by the bandpass filter 415, detected by detector 417, filtered by lowpass filter 419 and sampled by sampler 421.

The latch and generic signal timing circuit 335 is coupled to the output of the first combiner 319 and the output of the second combiner 329. The latch and generic signal timing circuit 335 latches to the stronger of the first detected signal or the second detected signal, and generates a timing signal synchronized to the stronger of the first detected signal and the second detected signal. The bit synchronizer 423, responsive to the timing signal from latch and generic signal timing circuit 335, controls the integrate and dump functions of the lowpass filter 419 and sampler 421.

If the number of radio devices in a current cell exceeds a specified limit such as a load threshold, the system of the present invention may perform a technique known as "shedding", in which a first base station in a first cell locks up; i.e. prevents additional hand-offs to radio devices entering the first cell. In addition, the first base station may also "load down" the first cell by instructing the radio devices outside a specified range threshold to seek and initiate hand-offs to base stations outside the first cell. In loading down the first cell, the first base station may change the load threshold to a lower number to handle fewer radio devices, or the first base station may change the range threshold to a lower setting and then instructing the radio devices outside the revised range threshold; i.e. the radio devices furthest out from the first base station, to initiate hand-offs to base-stations outside the first cell.

For such shedding, the system has the first base station further includes means for counting, embodied as a counter, a number of radio devices within the first cell as a count; and means, in response to the count crossing the load threshold, for preventing a hand-off to a radio device outside the range threshold. The first base station may further include means for changing the load threshold, or alternately, the first base station may further include means for changing the range threshold.

The first base station also includes generating means, which, in response to the count crossing a load threshold, generates a transfer signal for instructing each radio device outside the range threshold to initiate a respective hand-off the second base station. Further, each radio device responds to the transfer signal by initiating a respective hand-off to the second base station.

The present invention also includes a method for controlling hand-off in a spread-spectrum-CDMA-communications system, of radio devices moving from a first cell having a first base station, toward a second cell having a second base station. The first base station transmits a first spread-spectrum-communications signal with a first generic-chip-code signal embedded therein. The second base station transmits a second spread-spectrum-communications signal with a second generic-chip-code signal embedded therein. The first spread-spectrum-communications signal and the second spread-spectrum-communications signal are in time synchronization with each other. Accordingly, the first chip through $n^{th}$ chip of the first generic-chip-code signal are transmitted at the same time as the first chip through the $n^{th}$ chip of the second generic-chip-code signal, respectively.

For radio devices moving from a first cell, having a first base station transmitting a first spread-spectrum-communications signal with a first generic-chip-code signal embedded therein, toward a second cell having a second base station for transmitting a second spread-spectrum-communications signal with a second generic-chip-code signal embedded therein, the spread-spectrum-CDMA-communications system has a control unit for switching message data, spread-spectrum processed with a message-chip-code signal embedded in the first spread-spectrum-communications signal transmitted from the first base station, to the second spread-spectrum-communications signal transmitted from the second base station. Using the spread-spectrum-CDMA-communications system, the hand-off method controls hand-off of the radio devices using the steps of detecting the first generic-chip-code signal embedded in the first spread-spectrum-communications signal communicated from the first spread-spectrum-base station and outputting a first detected signal; detecting the second generic-chip-code signal embedded in the second spread-spectrum-communications signal communicated from the second spread-spectrum-base station and outputting a second detected signal; generating a comparison signal by comparing time of arrival of the second detected signal with the first detected signal; despreading, using message-spread-spectrum-processing means, the spread-spectrum-communications signal as a modulated-data signal; synchronizing, in response to the comparison signal being greater than a preset value threshold, the message-spread-spectrum-processing means to the first generic-chip-code signal for processing the first spread-spectrum-communications signal transmitted from the first base station; and synchronizing, in response to the comparison signal being less than the preset value threshold, the message-spread-spectrum-processing means to the second generic-chip-code signal for receiving the second spread-spectrum-communications signal transmitted from the second base station.

In addition, the method for controlling hand-off in the spread-spectrum-CDMA-communications system, of a specific radio device moving from a first cell having a first base station, toward a second cell having a second base station, includes the steps of transmitting, from the first base station, a first spread-spectrum-communications signal having a first chip-codeword sequence; transmitting, from the second base station, a second spread-spectrum-communications signal having a second chip-codeword sequence, with the second chip-codeword sequence of the second spread-spectrum-communications signal different from, and time synchronized with, the first chip-codeword sequence of the first spread-spectrum-communications signal; receiving, at the radio device, the first spread-spectrum-communications signal and the second spread-spectrum-communications signal; determining a relative time between receiving the second spread-spectrum-communications signal and the first spread-spectrum communications signal; and initiating, in response to the relative time, a hand-off for communicating between the radio device and the first base station to communicate between the radio device and the second base station. The step of initiating the hand-off includes the steps of comparing the relative time to a time threshold; and initiating the hand-off in response to the relative time crossing the time threshold.

The method further includes the steps of transmitting, from the radio device, a third spread-spectrum-communications signal having a third chip-codeword sequence; determining, using ranging techniques with the first spread-spectrum-communications signal and the third spread-spectrum-communications signal, a relative range between the first base station and the radio device; and having the step of initiating the hand-off occurring in response to the relative time crossing a time threshold and the relative range crossing a range threshold. The method may further include the step of requesting, from the radio device, a spread-spectrum channel for communicating with the second base station.

In an alternate embodiment, the method for controlling hand-off in a spread-spectrum-CDMA-communications system, of a radio device moving between a first cell having a first base station and a plurality of cells, with each cell of the plurality of cells having a base station, and adjacent to the first cell, may include the steps of transmitting, from the first base station, a first spread-spectrum-communications signal having a first chip-codeword sequence; transmitting in time synchronization from a plurality of base stations a plurality of spread-spectrum-communications signals with each of the plurality of spread-spectrum signals having a chip-codeword sequence different from the first chip-codeword sequence of the plurality of chip-codeword sequences; scanning, at the radio device, the plurality of spread-spectrum-communications signals from the plurality of cells adjacent to the first cell; determining a relative time between receiving the first spread-spectrum-communications signal and a second spread-spectrum signal from the plurality of spread-spectrum signals; and initiating, in response to the relative time being compared to a time threshold, a hand-off for communicating between the radio device and the first base station to communicating between the radio device and a second base station transmitting the second spread-spectrum-communications signal.

The step of initiating the hand-off includes the steps of comparing the relative time to the time threshold; and initiating the hand-off in response to the relative time crosses the time threshold. The method may further include the step of transmitting, from the radio device, a third spread-spectrum-communications signal having a third chip-codeword sequence; determining, using ranging techniques with the first spread-spectrum-communications signal and the third spread-spectrum-communications signal, a relative range between the first base station and the radio device; and initiating the hand-off in response to the relative time crossing a time threshold and the relative range crossing a range threshold. The method may further include the step of requesting, from the radio device, a spread-spectrum channel for communicating with the second base station.

The spread-spectrum-CDMA-communications system has a control unit for switching message and signalling data, spread-spectrum processed with a message-chip-code signal embedded in the first spread-spectrum-communications signal transmitted from the first base station, to the second spread-spectrum-communications signal transmitted from the second base station.

Referring to FIGS. 8A–8D, the method includes the steps of having the mobile station lock-on 502 to first generic-chip-code signal; passing 504 user information and supervisory/control information (power) between the mobile station and the first base station; having the first base station use 506 the supervisory/control channel to transmit neighbor codes 507; identifying 508, using the mobile station, the state of first generic-chip-code signal (P/2), code locked to first base station, at the mobile station; having the mobile station input 510 a neighbor code N and sets N to the state (P/2) of the first generic-chip-code signal; searching 512 through code n, using the mobile station, for a correlation over range of (P/2)-10 chips to (P/2)-40 chips; checking 514 for a correlation; indexing 516 the neighbor codes if there is no correlation; decoding 518, at the mobile station, a broadcast status channel from second base station to select a handoff channel and to send a message; sending 520 a message, from the mobile station to the first base station, of a successful correlation with the second base station, the message including identification of the second base station; determining 522, at the second base station, a communication code for a link between the mobile station and the second base station; transmitting 524, from the second base station to the mobile station, the identity of the generic-chip-code to be used for the communications link between the mobile station and the second base station on the fast code assignment channel; making 526 resources available, at the second base station, for establishing communications channels from the mobile station; setting up 528, between the mobile station and second base station, a spread spectrum communications channel between each other, using only the supervisory/control portion of the channel, with the channel assigned a temporary status; starting 530, at the mobile station, an evaluation process of links between the first base station and the mobile station by sending the value of the transmittal power of the mobile station; calculating 532 an index at the first base station, using measures of link quality, loading, and range rate of change; evaluating 534, at the second base station, the index to check if the index is positive or negative. If the index is negative, the method includes the steps of terminating 536 a transmission lock-out for a cycle of ten seconds, and returning to the step of indexing 516. However, if the index is positive, the method includes the step of evaluating 538 the index, at the second base station, with loading measures, range rate of change measures, and other parameters.

Concurrent with steps 530 to 534, the method further includes the steps of transmitting 540 all zeroes from the mobile station to the second base station; and performing 544 an error test over the frame at the second base station. If the error test is not successful, the method initiates the steps of asking 546 for a repeat of all ones for 100 cycles; transmitting 540 all zeroes from the mobile station; and initiates step 536 to terminate the transmission. However, if the error test is successful, the method initiates step 538 to evaluate parameters At the step of evaluating 538, if the evaluation of parameters is not successful, the method returns to step 536 to terminate the transmission. However, if the evaluation of parameters is successful, the method includes the steps of sending 548, from the second base station, an adopt message to the mobile station and to the first base station through the mobile station, and changing the status to normal; having the first base station to notify 550 the switch controller to handoff; having the second base station request 552 a trunk from the switch controller for user traffic; and switching 554, at the switch controller, the user traffic and ordering a tear down of the link between the mobile station and the first base station by issuing a tear down command.

Further, the method includes the steps of sending 556, from the first base station, in response to the tear down command, a tear down message to the mobile station, as well as to reassign resources; establishing 558 a trunk to the first base station; establishing 560 a trunk to the second base station; having the second base station assume 562 the primary entry role and sending a new neighbor list to the mobile station; switching 564 at the beginning of the next frame; switching 566 to a switch matrix; and connecting 568 to a private switched telephone network (PSTN).

In use, the first base station 124 transmits the first spread-spectrum-communications signal, which includes a first generic-chip-code signal and message and signalling data spread-spectrum processed with a first message-chip-code signal. The second base station 126 transmits the second spread-spectrum-communications signal, which includes a second generic-chip-code signal and message and signalling data spread-spectrum-processed with a second message-chip-code signal. The generic-chip-code signal embedded in the spread-spectrum-communications signal communicated from the second base station is assumed to have been found from a searching algorithm, as described previously from a multiplicity of spread-spectrum-communications signals. The radio device, which is in transition from the first cell 112 to the second cell 114, receives the first spread-spectrum-communications signal and the second spread-spectrum-communications signal through the cellular antenna, low noise amplifier 303 and down converter 305. An AGC 307 adjusts the power or voltage level of the received signals. At least a first matched filter 315 is coupled to the AGC, and has an impulse response matched to the first generic-chip-code signal. The first detector 315 detects a first pulse at an output of the first matched filter 315 when the first generic-chip-code signal passes through the first matched filter 315, and outputs the detected signal as a first detected signal. At least a second matched filter 325 is coupled to the AGC 307 and has an impulse response matched to the second generic-chip-code signal. The second detector 326 detects a second pulse at an output of the second matched filter 325 when the second generic-chip-code signal passes through the second matched filter. The second detector 326 outputs a second detected signal.

In the preferred embodiment, a comparison signal is generated by comparing the relative time of arrival of the second detected signal with the first detected signal. In an alternative embodiment, the comparison signal is generated by comparing the relative distance of the second detected signal with the first detected signal. In another embodiment, the comparison signal is generated by comparing the relative power level of the second detected signal with the first detected signal.

The first message-chip-code generator 401 generates a replica of the first message-chip-code signal and the second message-chip-code signal. The first message-chip-code signal may be the same as the second message-chip-code signal, depending on application.

The first message mixer 403 is coupled to the first message-chip-code generator 401 and the cellular antenna. Using the replica of the message-chip-code signal, the first message mixer 403 despreads the first spread-spectrum-communications signal or the second spread-spectrum-communications signal as a modulated-data signal. The message-bandpass filter filters the modulated-data signal. The message detector demodulates the modulated-data signal as received data.

A synchronization circuit is coupled to the comparator. When the comparison signal crosses a threshold, i.e. is greater than a threshold, the synchronization circuit synchronizes the first message-chip-code generator 401 to the first generic-chip-code signal for receiving the first spread-spectrum-communications signal which was transmitted from the first base station 124. When the comparison signal is less than the threshold, the synchronization circuit synchronizes the receiver-message-chip-code generator to the second generic-chip-code signal for receiving the second spread-spectrum-communications signal from which was transmitted the second base station 126.

The control unit 130 which is coupled to the first base station 124 and the second base station 126 switches the message and signalling data spread-spectrum processed with a message-chip-code signal, embedded in the first spread-spectrum-communications signal transmitted from the first base station 124, to the second spread-spectrum-communications signal transmitted from the second base station 126.

The message-chip-code signals for a particular base station transmitter may be stored in a memory as part of the chip-codeword controller 340, or may be updated as the mobile station 122 moves from cell to cell. In the latter case, one of the message and signalling data of FIG. 3 can be used as a signalling channel for updating the generic-chip-code signals and message-chip-code signals. An updated or new generic-chip code signal and message-chip-code signal for a new cell to which the mobile station is in transition can be controlled by control unit 130 and communicated from a base station using the signalling channel to the mobile station. The chip-codeword controller 340 is, therefore, updated with a new generic-chip-code signal and a new message-chip-code signal. The chip-codeword controller 340 can set the second matched filter 325 and fourth matched filter 327 to have an impulse response matched to the new generic-chip-code signal. The chip-codeword controller 340 also can set the second message-chip-code generator 405 to generate the new message-chip code signal. As the mobile station 122 moves into the new cell, and the voltage level of the second detected signal increases to a level greater than the first detected signal, the electronic switch 413 switches to receiving the spread-spectrum processed signal to the second message mixer 407. Thus, a smooth transition can be made when handing-off from the first base station to the second base station.

The first message-chip-code signal is synchronized to the first generic-chip-code signal, and the second message-chip-code is synchronized to the second generic-chip-code signal. The bit synchronizer 423 typically receives bit synchronization timing from the first generic-chip-code signal or the second generic-chip-code signal, from chip-codeword controller 340, These concepts are taught in U.S. patent application Ser. No. 07/626,109, having a filing date of Dec. 14, 1990, entitled, SYNCHRONOUS SPREAD-SPECTRUM COMMUNICATIONS SYSTEM AND METHOD by Donald L. Schilling, which is incorporated herein by reference.

The transmitter in mobile station 122 may operate in a similar manner, as the base stations by having two spread-spectrum channels for communicating with the first base station and the second base station. The particular message-chip-code signals used for the transmitter of the mobile station 122 can be sent through the signalling channel, and controlled by chip-codeword controller 340.

The method may further include the steps of counting a number of radio devices within the first cell as a count; and preventing, responsive to the count crossing a load threshold, a hand-off to a radio device outside a range threshold. The method may also include changing the load threshold. In addition, the method may include changing the range threshold.

To perform "shedding" of the load in a current cell, the method also includes the steps of generating, in response to the count crossing a load threshold, a transfer signal; instructing each radio device outside the range threshold, using the transfer signal, to initiate a respective hand-off to the second base station; and initiating, at each radio device outside the range threshold, a respective hand-off to the second base station. Therefore, if the cell is loading down, the first base station may change the range threshold and instruct radio devices outside the revised range threshold to hand-off to a base station in another cell.

The present invention may also be used in conjunction with mobile stations including analog AMPS radio capabilities. If the area has only partial coverage by CDMA cells, i.e. if cell 112 is analog but does not have CDMA, while cell 114 has both analog and CDMA coverage, the mobile stations preferably operate as CDMA terminals when CDMA coverage is available. For a mobile station in cell 112, the mobile station is allowed to scan all pilot codes within a normal radius down to a predetermined distance. The scanning of the mobile station is similar to scanning a register in a CDMA system while the mobile station is registered in the analog system. The CDMA may further include dual-mode analog mobile stations embodied as dual-mode analog radio devices.

Once a CDMA pilot code is detected, the hand-off procedures follow the same procedure as for CDMA procedures, except that the first base station is not included. The second base station in cell 114 communicates with the mobile station to determine the prospect of a hand-off to respective CDMA base station of the mobile station. The range within a reliable coverage range, or the range to the second base station may be used for determining a hand-off. Once the second base station determines adopting a dual-mode mobile station, the second base station contacts the switch controller to notify the switch to hand-off as well as to identify the communication path currently in use by the dual-mode analog mobile station, embodied as a dual-mode analog radio device, including the assignment of a trunk to the second base station, and the switch controller directs a hand-off toward the analog side of the dual-mode analog mobile station to direct user information to the established CDMA links with the second base station. The dual-mode mobile station also turns off the analog radio device as the dual-mode mobile station completes the directed hand-off, in order to prevent unnecessary waiting until the analog signal deteriorates prior to performing the hand-off.

The present invention may be part of a digital processing chip, a combination of digital signal processing chips and/or discrete components. The embodiments shown in the figures and disclosed herein are illustrative, with the invention encompassing the broader means plus function and/or methods disclosed herein. It will be apparent to those skilled in the art that various modifications can be made to the spread-spectrum hand-off apparatus and method of the instant invention without departing from the scope or spirit of the invention, and it is intended that the present invention cover modifications and variations of the spread-spectrum hand-off apparatus and method provided they are within the scope of the appended claims and their equivalents.

We claim:

1. An apparatus for controlling hand-off of radio devices moving from one cell toward an adjacent cell of a spread-spectrum code-division-multiple-access communications system (spread-spectrum-CDMA-communications system), each adjacent cell having its own generic-chip-code signal embedded in a spread-spectrum-communications signal, comprising:
   a first base station for transmitting a first spread-spectrum-communications signal having a first generic-chip-code signal and message data spread-spectrum processed with a message-chip-code signal, embedded therein;
   a second base station for transmitting a second spread-spectrum communications signal having a second generic-chip-code signal embedded therein;
   a radio device including,
      a cellular antenna;
      a first matched filter coupled to said cellular antenna and having a first impulse response matched to the first generic-chip-code signal;
      a first detector coupled to said first matched filter for detecting the first generic-chip-code signal embedded in the first spread-spectrum-communications signal communicated from said first-base station and outputting a first detected signal;
      a second matched filter coupled to said cellular antenna and having a second impulse response matched to the second generic-chip-code signal;
      a second detector coupled to said second matched filter for detecting the second generic-chip-code signal embedded in the second spread-spectrum-communications signal communicated from said second base-station and outputting a second detected signal;
      a comparator coupled to said first detector and to said second detector for generating a relative time comparison signal by comparing time of detecting the second detected signal with time of detecting the first detected signal;
      a receiver-message-chip-code generator for generating a replica of the message-chip-code signal;
      a message mixer coupled to said receiver-message-chip-code generator and said cellular antenna, responsive to the replica of the message-chip-code signal, for despreading one of the first spread-spectrum-communications signal and the second spread-spectrum-communications signal as a modulated-data signal;
      a message-bandpass filter coupled to said message mixer for filtering the modulated-data signal;
      a message detector for demodulating the modulated-data signal as received data;
      a synchronization circuit coupled to said comparator and responsive to the relative time comparison signal being greater than a threshold, for synchronizing said receiver-message-chip-code generator to the first generic-chip-code signal for receiving the first spread-spectrum-communications signal from said first base station, and responsive to the relative time comparison signal being less than the threshold, for synchronizing said receiver-message-chip-code generator to the second generic-chip-code signal for receiving the second spread-spectrum-communications signal from said second base station; and
   a control unit coupled to said first base station and said second base station and to a plurality of other base stations for switching the message data spread-spectrum processed with the message-chip-code signal, embedded in the first spread-spectrum-communications signal transmitted from said first-base station, to the second spread-spectrum-communications signal transmitted from said second base station.

2. An apparatus for controlling hand-off of radio devices moving from one cell toward an adjacent cell of a spread-spectrum-CDMA-communications system, each adjacent cell having its own generic-chip-code signal embedded in a spread-spectrum-communications signal, comprising:
   a first base station for transmitting a first spread-spectrum-communications signal having a first generic-chip-code signal embedded therein;

a second base station for transmitting a second spread-spectrum-communications signal having a second generic-chip-code signal embedded therein;

a radio device including, a cellular antenna;

first generic-detection means coupled to said cellular antenna and including first generic-spread-spectrum-processing means, for detecting the first generic-chip-code signal embedded in the first spread-spectrum-communications signal communicated from said first-base station and outputting a first detected signal;

second generic-detection means coupled to said cellular antenna and including second generic-spread-spectrum-processing means, for detecting the second generic-chip-code signal embedded in the second spread-spectrum-communications signal communicated from said second-base station and outputting a second detected signal;

comparator means for generating a comparison signal by comparing time of arrival of the second detected signal with time of arrival of the first detected signal;

message-spread-spectrum-processing means coupled to said cellular antenna for despreading one of the first spread-spectrum-communications signal and the second spread-spread-communications signal as a modulated-data signal;

message-detection means for demodulating the modulated-data signal as received data;

synchronizing means responsive to the comparison signal being greater than a threshold, for synchronizing said message-spread-spectrum-processing means and said message detection means to the first generic-chip-code signal for receiving the first spread-spectrum-communications signal transmitted from said first base station, and responsive to the comparison signal being less than the threshold, for synchronizing said message-spread-spectrum-processing means and said message-detection means to the second generic-chip-code signal for receiving the second spread-spectrum-communications signal transmitted from said second base station; and control means for switching message data spread-spectrum processed with a message-chip-code signal embedded in the first spread-spectrum-communications signal transmitted from said first base station, to the second spread-spectrum-communications signal transmitted from said second base station.

3. The apparatus as set forth in claim 2 further including:

chip-code means for controlling impulse responses of said first generic-detection means and said second generic-detection means.

4. The apparatus as set forth in claim 3 wherein said chip-code means controls an impulse response of said message-spread-spectrum-processing means.

5. The apparatus as set forth in claim 2 wherein:

said first generic-detection means includes a first matched filter having a first impulse response matched to the first generic-chip-code signal; and said second generic-detection means includes a second matched filter having a second impulse response matched to the second generic-chip-code signal.

6. The apparatus as set forth in claim 2 wherein:

said first generic-detection means includes a first correlator for correlating a first received spread-spectrum-communications signal with the first generic-chip-code signal; and said second generic-detection means includes a second correlator for correlating a second received spread-spectrum-communications signal with the second generic-chip-code signal.

7. The apparatus as set forth in claim 2 wherein said message-spread-spectrum-processing means includes a message-matched filter for despreading a received spread-spectrum-communications signal as the modulated-data signal.

8. The apparatus as set forth in claim 2 wherein said message-spread-spectrum-processing means includes a message-correlator for despreading one of the first spread-spectrum-communications signal and the second spread-spectrum-communications signal as the modulated-data signal.

9. An apparatus for controlling hand-off in a spread-spectrum-CDMA-communications system, having a radio device moving from a first cell with a first base station for transmitting a first spread-spectrum-communications signal with a first generic-chip-code signal embedded therein, toward a second cell having a second base station for transmitting a second spread-spectrum-communications signal with a second generic-chip-code signal embedded therein, said spread-spectrum-CDMA-communications system having a control unit for switching message data spread-spectrum processed with a message-chip-code signal embedded in the first spread-spectrum-communications signal transmitted from said first base station, to the second spread-spectrum-communications signal transmitted from said second base station, said apparatus comprising:

a cellular antenna;

first generic-detection means coupled to said cellular antenna and including first generic-spread-spectrum-processing means, for detecting the first generic-chip-code signal embedded in the first spread-spectrum-communications signal communicated from said first-base station and outputting a first detected signal;

second generic-detection means coupled to said cellular antenna and including second generic-spread-spectrum-processing means, for detecting the second generic-chip-code signal embedded in the second spread-spectrum-communications signal communicated from said second-base station and outputting a second detected signal;

comparator means for generating a comparison signal by comparing time of arrival of the second detected signal with time of arrival of the first detected signal;

message-spread-spectrum-processing means coupled to said cellular antenna for despreading one of the first spread-spectrum-communications signal and the second spread-spectrum-communications signal as a modulated-data signal; and synchronizing means responsive to the comparison signal being greater than a threshold, for synchronizing said message-spread-spectrum-processing means to the first generic-chip-code signal for processing the first spread-spectrum-communications signal transmitted from said first base station, and responsive to the comparison signal being less than the threshold for synchronizing said message-spread-spectrum-processing means to the second generic-chip-code signal for receiving the second spread-spectrum-communications signal transmitted from said second base station.

10. The apparatus as set forth in claim 9 further including:
chip-code means for controlling impulse responses of said first generic-detection means and said second generic-detection means.

11. The apparatus as set forth in claim 10 wherein said chip-code means controls an impulse response of said message-spread-spectrum-processing means.

12. The apparatus as set forth in claim 9 wherein:
said first generic-detection means includes a first matched filter having a first impulse response matched to the first generic-chip-code signal; and
said second generic-detection means includes a second matched filter having a second impulse response matched to the second generic-chip-code signal.

13. The apparatus as set forth in claim 9 wherein:
said first generic-detection means includes a first correlator for correlating a first received spread-spectrum-communications signal with the first generic-chip-code signal; and
said second generic-detection means includes a second correlator for correlating a second received spread-spectrum-communications signal with the second generic-chip-code signal.

14. The apparatus as set forth in claim 9 wherein said message-spread-spectrum-processing means includes a message-matched filter for despreading a received spread-spectrum-communications signal as the modulated-data signal.

15. The apparatus as set forth in claim 9 wherein said message-spread-spectrum-processing means includes a message-correlator for despreading one of the first spread-spectrum-communications signal as the modulated-data signal and the second spread-spectrum-communications signal.

16. A method for controlling hand-off in a spread-spectrum CDMA-communications system, of radio devices moving from a first cell having a first base station for transmitting a first spread spectrum-communications signal with a first generic-chip-code signal embedded therein, toward a second cell having a second base station for transmitting a second spread-spectrum-communications signal with a second generic-chip-code signal embedded therein, said spread-spectrum-CDMA-communications system having a control unit for switching message data processed with a message-chip-code signal embedded in the first spread-spectrum-communications signal transmitted from said first base station, to the second spread-spectrum-communications signal transmitted from said second base station, said method comprising the steps of:
detecting the first generic-chip-code signal embedded in the first spread-spectrum-communications signal communicated from said first-base station and outputting a first detected signal;
detecting the second generic-chip-code signal embedded in the second spread-spectrum-communications signal communicated from said second-base station and outputting a second detected signal;
generating a comparison signal by comparing time of arrival of the second detected signal with time of arrival of the first detected signal;
despreading, using message-spread-spectrum-processing means, one of the first spread-spectrum-communications signal and the second spread-spectrum-communications signal as a modulated-data signal;
synchronizing, in response to the comparison signal being greater than a threshold, said message-spread-spectrum-processing means to the first generic-chip-code signal for processing the first spread-spectrum-communications signal transmitted from said first base station; and
synchronizing, in response to the comparison signal being less than the threshold, said message-spread-spectrum-processing means to the second generic-chip-code signal for receiving the second spread-spectrum-communications signal transmitted from said second base station.

17. A method for controlling hand-off in a spread-spectrum CDMA-communications system, of a radio device moving from a first cell having a first base station, toward a second cell having a second base station, said method comprising the steps of:
transmitting, from said first base station, a first spread-spectrum-communications signal having a first chip-codeword sequence;
transmitting, from said second base station, a second spread-spectrum-communications signal having a second chip-codeword sequence, with the second chip-codeword sequence of the second spread-spectrum-communications signal different from, and time synchronized with, the first chip-codeword sequence of the first spread-spectrum-communications signal;
receiving, at said radio device, the first spread-spectrum-communications signal and the second spread-spectrum-communications signal;
determining a relative time between receiving the second spread-spectrum-communications signal and the first spread-spectrum communications signal; and
initiating, in response to the relative time, a handoff for communicating between said radio device and said first base station to communicate between said radio device and said second base station.

18. The method as set forth in claim 17 wherein the step of initiating the hand-off includes the steps of:
comparing the relative time to a threshold; and
initiating the hand-off in response to the relative time crossing the threshold.

19. The method as set forth in claim 17 further including the steps of:
transmitting, from said radio device, a third spread-spectrum-communications signal having a third chip-codeword sequence;
determining, using ranging techniques with the first spread-spectrum-communications signal and the third spread-spectrum-communications signal, a relative range between said first base station and said radio device; and
wherein the step of initiating the hand-off includes the step of initiating the hand-off in response to the relative time crossing a time threshold and the relative range crossing a range threshold.

20. The method as set forth in claim 17 further including the step of:
requesting, from said radio device, a spread-spectrum channel for communicating with said second base station.

21. A method for controlling hand-off in a spread-spectrum-CDMA-communications system, of a radio device moving between a first cell having a first base station and a plurality of cells, with each cell of the plurality of cells having a base station, and adjacent to the first cell, comprising the steps of:

transmitting, from said first base station, a first spread-spectrum-communications signal having a first chip-codeword sequence;

transmitting in time synchronization from a plurality of base stations a plurality of spread-spectrum-communications signals with each of the plurality of spread-spectrum-communications signals having a chip-codeword sequence different from the first chip-codeword sequence of a plurality of chip-codeword sequences;

scanning, at said radio device, the plurality of spread-spectrum-communications signals from the plurality of cells adjacent to said first cell;

determining a relative time between receiving the first spread-spectrum-communications signal and a second spread-spectrum-communications signal from the plurality of spread-spectrum-communications signals; and initiating, in response to the relative time being compared to a time threshold, a hand-off for communicating between said radio device and said first base station to communicating between said radio device and a second base station transmitting the second spread-spectrum-communications signal.

22. The method as set forth in claim 21 wherein the step of initiating the hand-off includes the steps of:

comparing the relative time to the time threshold; and initiating the hand-off in response to the relative time crossing the time threshold.

23. The method as set forth in claim 21 further including the steps of:

transmitting, from said radio device, a third spread-spectrum-communications signal having a third chip-codeword sequence;

determining, using ranging techniques with the first spread-spectrum-communications signal and the third spread-spectrum-communications signal, a relative range between said first base station and said radio device; and wherein the step of initiating the hand-off includes the step of initiating the hand-off in response to the relative time crossing a time threshold and the relative range crossing a range threshold.

24. The method as set forth in claim 21 further including the step of:

requesting, from said radio device, a spread-spectrum channel for communicating with said second base station.

25. A system for controlling hand-off in a spread-spectrum-CDMA-communications system, of a radio device moving from a first cell having a first base station, toward a second cell having a second base station, said system comprising:

means for transmitting, from said first base station, a first spread-spectrum-communications signal having a first chip-codeword sequence;

means for transmitting, from said second base station, a second spread-spectrum-communications signal having a second chip-codeword sequence, with the second chip-codeword sequence of the second spread-spectrum-communications signal different from, and time synchronized with, the first chip-codeword sequence of the first spread-spectrum-communications signal;

means for receiving, at said radio device, the first spread-spectrum-communications signal and the second spread-spectrum-communications signal;

means for determining a relative time between receiving the second spread-spectrum-communications signal and the first spread-spectrum communications signal; and means, responsive to the relative time, for initiating a hand-off for communicating between said radio device and said first base station, to communicate between said radio device and said second base station.

26. The system as set forth in claim 25 wherein said means for initiating the hand-off includes:

means for comparing the relative time to a time threshold;

means for initiating the hand-off in response to the relative time crossing the threshold; and means for detecting codes from base stations within a shorter distance than a range distance to the first base station.

27. The system as set forth in claim 25 further including:

means for transmitting, from said radio device, a third spread-spectrum-communications signal having a third chip-codeword sequence;

means for determining, using ranging techniques with the first spread-spectrum-communications signal and the third spread-spectrum-communications signal, a relative range between said first base station and said radio device; and wherein said means for initiating the hand-off includes the step of initiating the hand-off in response to the relative time crossing a time threshold and the relative range crossing a range threshold.

28. The system as set forth in claim 25 further including:

means for requesting, from said radio device, a spread-spectrum channel for communicating with said second base station.

29. A system for controlling hand-off in a spread-spectrum-CDMA-communications system, of a radio device moving between a first cell having a first base station and a plurality of cells, with each cell of the plurality of cells having a base station, and adjacent to the first cell, comprising:

means for transmitting, from said first base station, a first spread-spectrum-communications signal having a first chip-codeword sequence;

means for transmitting in time synchronization from a plurality of base stations a plurality of spread-spectrum-communications signals with each of the plurality of spread-spectrum-communications signals having a chip-codeword sequence different from the first chip-codeword sequence of a plurality of chip-codeword sequences;

means for scanning, at said radio device, the plurality of spread-spectrum-communications signals from the plurality of cells adjacent to said first cell;

means for determining a relative time between receiving the first spread-spectrum-communications signal and a second spread-spectrum-communications signal from the plurality of spread-spectrum-communications signals; and means, responsive to the relative time being compared to a time threshold, for initiating a hand-off for communicating between said radio device and said first base station to communicating between said radio device and a second base station transmitting the second spread-spectrum-communications signal.

30. The system as set forth in claim 29 wherein said means for initiating the hand-off includes:
  means for comparing the relative time to the time threshold; and
  means for initiating the hand-off in response to the relative time crossing the time threshold.

31. The system as set forth in claim 29 further including:
  means for transmitting, from said radio device, a third spread-spectrum-communications signal having a third chip-codeword sequence;
  means for determining, using ranging techniques with the first spread-spectrum-communications signal and the third spread-spectrum-communications signal, a relative range between said first base station and said radio device; and
  wherein said means for initiating the hand-off includes means for initiating the hand-off in response to the relative time crossing the time threshold and the relative range crossing a range threshold.

32. The system as set forth in claim 29 further including the step of:
  means for requesting, from said radio device, a spread-spectrum channel for communicating with said second base station.

33. A system for controlling hand-off in a spread-spectrum-CDMA-communications system, of a radio device moving from a first cell having a first base station, toward a second cell having a second base station, said system comprising:
  a first transmitter, located at said first base station, for transmitting a first spread-spectrum-communications signal having a first chip-codeword sequence;
  a second transmitter, located at said second base station, for transmitting a second spread-spectrum-communications signal having a second chip-codeword sequence, with the second chip-codeword sequence of the second spread-spectrum-communications signal different from, and time synchronized with, the first chip-codeword sequence of the first spread-spectrum-communications signal;
  a receiver located at said radio device, for receiving the first spread-spectrum-communications signal and the second spread-spectrum-communications signal;
  a timing circuit for determining a relative time between receiving the second spread-spectrum-communications signal and the first spread-spectrum communications signal; and
  a hand-off circuit, responsive to the relative time, for initiating a hand-off for communicating between said radio device and said first base station to communicate between said radio device and said second base station.

34. The system as set forth in claim 33 wherein said hand-off circuit includes:
  a comparator for comparing the relative time to a time threshold; and
  means for initiating the hand-off in response to the relative time crossing the time threshold.

35. The system as set forth in claim 33 further including:
  a mobile transmitter, located at said radio device, for transmitting a third spread-spectrum-communications signal having a third chip-codeword sequence;
  a ranging circuit, using ranging techniques with the first spread-spectrum-communications signal and the third spread-spectrum-communications signal, for determining a relative range between said first base station and said radio device; and
  wherein said hand-off circuit includes means for initiating the hand-off in response to the relative time crossing a time threshold and the relative range crossing a range threshold.

36. The system as set forth in claim 33 further including:
  means, located at said radio device, for requesting a spread-spectrum channel for communicating with said second base station.

37. A system for controlling hand-off in a spread-spectrum-CDMA-communications system, of a radio device moving between a first cell having a first base station and a plurality of cells, with each cell of the plurality of cells having a base station, and adjacent to the first cell, said system comprising:
  a first transmitter, located at said first base station, for transmitting a first spread-spectrum-communications signal having a first chip-codeword sequence;
  a plurality of transmitters located at a plurality of base stations, respectively, for transmitting in time synchronization a plurality of spread-spectrum-communications signals with each of the plurality of spread-spectrum-communications signals having a chip-codeword sequence different from the first chip-codeword sequence of a plurality of chip-codeword sequences;
  a scanning circuit, located at said radio device, for scanning the plurality of spread-spectrum-communications signals from the plurality of cells adjacent to said first cell;
  a timing circuit for determining a relative time between receiving the first spread-spectrum-communications signal and a second spread-spectrum-communications signal from the plurality of spread-spectrum-communications signals; and
  a hand-off circuit, responsive to the relative time being compared to a time threshold, for initiating a hand-off for communicating between said radio device and said first base station to communicate between said radio device and a second base station transmitting the second spread-spectrum-communications signal.

38. The system as set forth in claim 37 wherein said handoff circuit includes:
  a comparator for comparing the relative time to the time threshold; and
  means for initiating the hand-off in response to the relative time crossing the time threshold.

39. The system as set forth in claim 37 further including:
  a transmitter located at said radio device, for transmitting a third spread-spectrum-communications signal having a third chip-codeword sequence;
  a ranging circuit, using ranging techniques with the first spread-spectrum-communications signal and the third spread spectrum-communications signal, for determining a relative range between said first base station and said radio device; and
  wherein said hand-off circuit includes means for initiating the hand-off in response to the relative time crossing a time threshold and the relative range crossing a range threshold.

40. The system as set forth in claim 37 further including:
means located at said radio device, for requesting a spread-spectrum channel for communicating with said second base station.

41. The system as set forth in claim 31 wherein said first base station further includes:
means for counting a plurality of radio devices within the first cell as a count; and
means, responsive to the count crossing a load threshold, for preventing a load threshold hand-off to a selected number of the plurality of radio devices outside the range threshold.

42. The system as set forth in claim 41 wherein said first base station further includes means for changing the load threshold.

43. The system as set forth in claim 41 wherein said first base station further includes means for changing the range threshold.

44. The system as set forth in claim 43 wherein said first base station further includes means, responsive to the count crossing the load threshold, for generating a transfer signal for instructing each of the selected number of the plurality of radio devices outside the range threshold to initiate the load-threshold hand-off to the second base station; and
wherein each radio device, responsive to the transfer signal, initiates the load-threshold hand-off to the second base station.

45. The method as set forth in claim 21 further including the steps of:
counting a plurality of radio devices within the first cell as a count; and
preventing, responsive to the count crossing a load threshold, a load-threshold hand-off to a selected number of the plurality of radio devices outside a range threshold.

46. The method as set forth in claim 45 further including the step of changing the load threshold.

47. The method as set forth in claim 45 further including the step of changing the range threshold.

48. The method as set forth in claim 45 further including the steps of:
generating, responsive to the count crossing the load threshold, a transfer signal;
instructing each of the selected number of the plurality of radio devices outside the range threshold, using the transfer signal, to initiate a load-threshold hand-off to the second base station; and
initiating, at each of the selected number of the plurality of radio devices outside the range threshold, the load-threshold hand-off to the second base station.

49. The system as set forth in claim 37, further comprising:
a plurality of dual-mode analog radio devices for operating on an analog radio side and for operating on a CDMA radio side;
a plurality of CDMA radio devices for operating on the CDMA radio side;
a plurality of CDMA-base stations for operating on the CDMA radio side; and
wherein said plurality of dual-mode analog radio devices and said plurality of CDMA radio devices allow a call from a dual-mode analog radio device on the analog radio side and connected to said first base station, to be handed-off to a CDMA-base station using the CDMA radio side to access the CDMA radio side of the dual-mode analog radio device.

50. A system for controlling hand-off in a spread-spectrum-CDMA-communications system, of a radio device moving between a plurality cells, with each cell having a base station, and adjacent to a first cell, said system comprising:
a plurality of dual-mode analog radio devices for operating on an analog radio side and for operating on a CDMA radio side;
a plurality of CDMA radio devices for operating on the CDMA radio side;
a plurality of CDMA-base stations for operating on the CDMA radio side;
a plurality of transmitters located at a plurality of base stations, respectively, for transmitting in time synchronization a plurality of spread-spectrum-communications signals;
a scanning circuit, located at said radio device, for scanning the plurality of spread-spectrum-communications signals from the plurality of cells;
a timing circuit for determining a relative time between receiving a first spread-spectrum-communications signal and a second spread-spectrum-communications signal from the plurality of spread-spectrum-communications signals; and
a hand-off circuit, responsive to the relative time being compared to a time threshold, for initiating a hand-off for communicating between said radio device and said plurality of base stations.

* * * * *